US012795585B2

(12) United States Patent
Manolakos et al.

(10) Patent No.: US 12,795,585 B2
(45) Date of Patent: Nov. 10, 2026

(54) POSITIONING FREQUENCY LAYER DISCOVERY AND MEASUREMENT

(71) Applicant: QUALCOMM Incorporated, San Diego, CA (US)

(72) Inventors: Alexandros Manolakos, Athens (GR); Mukesh Kumar, Hyderabad (IN); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 18/293,046

(22) PCT Filed: Aug. 16, 2022

(86) PCT No.: PCT/US2022/040426
§ 371 (c)(1),
(2) Date: Jan. 29, 2024

(87) PCT Pub. No.: WO2023/038766
PCT Pub. Date: Mar. 16, 2023

(65) Prior Publication Data

US 2024/0334371 A1 Oct. 3, 2024

(30) Foreign Application Priority Data

Sep. 13, 2021 (GR) .............................. 20210100600

(51) Int. Cl.
*H04W 64/00* (2009.01)
*G01S 5/02* (2010.01)
(Continued)

(52) U.S. Cl.
CPC .................................. *H04W 64/00* (2013.01)

(58) Field of Classification Search
CPC ........... H04W 4/00–029; G01S 5/0236; H04L 5/0048
See application file for complete search history.

(56) References Cited

U.S. PATENT DOCUMENTS

2020/0092737 A1* 3/2020 Siomina ................ H04W 4/025
2021/0311158 A1* 10/2021 Akkarakaran .......... H04W 4/02
(Continued)

OTHER PUBLICATIONS

3GPP TS 38.133: "3rd Generation Partnership Project, Technical Specification Group Radio Access Network, NR, Requirements for Support of Radio Resource Management (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG4, No. V17.2.0, Jul. 9, 2021, pp. 67-535, XP052030259, 469 Pages, p. 42, 5th-6th cell from top, 3rd cell from left, Best Available Date: Jun. 2021.
(Continued)

*Primary Examiner* — San Htun
(74) *Attorney, Agent, or Firm* — QUALCOMM Incorporated

(57) ABSTRACT

Techniques are provided for utilizing positioning reference signals (PRS) to determine a location of a wireless node. An example method for reporting positioning reference signals measurement values with a wireless node includes providing capabilities information including an indication of a number of positioning frequency layers to be included in a single measurement report, and an indication of a number of positioning frequency layers that can be measured simultaneously, receiving positioning assistance data comprising
(Continued)

positioning reference signal configuration information, measuring positioning reference signals in the number of positioning frequency layers to be included in the single measurement report based at least in part on the positioning assistance data, and transmitting the single measurement report.

30 Claims, 20 Drawing Sheets

(51) Int. Cl.

| | |
|---|---|
| ***H04L 5/00*** | (2006.01) |
| ***H04W 24/10*** | (2009.01) |

(56) References Cited

U.S. PATENT DOCUMENTS

| | | | | |
|---|---|---|---|---|
| 2021/0337377 | A1* | 10/2021 | Manolakos | G01S 5/0236 |
| 2022/0116089 | A1* | 4/2022 | Khoryaev | H04W 64/00 |
| 2022/0283259 | A1* | 9/2022 | Tao | G01S 5/0036 |
| 2022/0369270 | A1* | 11/2022 | Jiang | H04W 64/00 |
| 2023/0300660 | A1* | 9/2023 | Zheng | H04L 5/0048 370/252 |

OTHER PUBLICATIONS

International Search Report and Written Opinion—PCT/US2022/040426—ISA/EPO—Nov. 29, 2022.

Moderator (Huawei., et al.,): "Email Discussion Summary for [96e] [215] NR_pos_RRM_1", 3GPP TSG-RAN WG4 Meeting # 96-e, R4-2012215, 3rd Generation Partnership Project, Mobile Competence Centre, 650, Route Des Lucioles, F-06921 Sophia-Antipolis Cedex, France, vol. RAN WG4, No. Electronic Meeting, Aug. 17-28, 2020, Aug. 30, 2020, XP051923658, 105 Pages, p. 18, line 2-9, p. 60, line 1-8.

Nokia et al: "Selection of Positioning Frequency Layer for MG Occasion", 3GPP TSG-RAN WG4 Meeting #100-e, R4-2114067, 3rd Generation Partnership Project, Mobile Competence Centre, 650, Route Des Lucioles, F-06921 Sophia-Antipolis Cedex, France, vol. RAN WG4, No. Electronic Meeting, Aug. 16, 2021-Aug. 27, 2021, Aug. 27, 2021, XP052043946, p. 1, "Summary of Change", 1. 4-6, p. 2, 1. 4-3 from bottom, 8 Pages, Aug. 16-27, 2021.

Qualcomm Incorporated: "On PRS-RSTD Measurements in NR Positioning," 3GPP Draft, 3GPP TSG-RAN WG4 Meeting #96-e, R4-2009874, 3rd Generation Partnership Project (3GPP), Mobile Competence Centre, 650, Route Des Lucioles, F-06921, Sophia-Antipolis Cedex, France, vol. RAN WG4. No. Online, Aug. 17, 2020-Aug. 28, 2020, Aug. 7, 2020 (Aug. 7, 2020), XP051912949, 11 pages, pp. 1-11, Aug. 17-28, 20200.

* cited by examiner

POSITIONING FREQUENCY LAYER DISCOVERY AND MEASUREMENT

CROSS-REFERENCE TO RELATED APPLICATION

This application is the National Stage of International Application No. PCT/US2022/040426, filed Aug. 16, 2022, entitled "POSITIONING FREQUENCY LAYER DISCOVERY AND MEASUREMENT," which claims the benefit of Greek Patent Application No. 20210100600, filed Sep. 13, 2021, entitled "POSITIONING FREQUENCY LAYER DISCOVERY AND MEASUREMENT," both of which are assigned to the assignee hereof, and the entire contents of both of which are hereby incorporated by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, consumer asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. Improvements in position related signaling may improve the efficiency of mobile devices.

SUMMARY

An example method for reporting positioning reference signals measurement values with a wireless node according to the disclosure includes providing capabilities information including an indication of a number of positioning frequency layers to be included in a single measurement report, and an indication of a number of positioning frequency layers that can be measured simultaneously, receiving positioning assistance data comprising positioning reference signal configuration information, measuring positioning reference signals in the number of positioning frequency layers to be included in the single measurement report based at least in part on the positioning assistance data, and transmitting the single measurement report.

Implementations of such a method may include one or more of the following features. Receiving a request from a location server to measure positioning reference signals in a single positioning frequency layer based on the single measurement report. The indication of the number of positioning frequency layers to be included in the single measurement report further may include an indication of at least one wireless interface. The indication of the at least one wireless interface may include an indication associated with a Uu interface or an indication associated with a sidelink interface. The single measurement report may include an indication of a number of positioning reference signals received in a positioning frequency layer. The single measurement report may include one or more positioning reference signal measurement values associated with a plurality of positioning frequency layers, and the method may further include receiving an indication of a preferred positioning frequency layer, and measuring a plurality of positioning reference signals associate with the preferred positioning frequency layer. A preferred positioning frequency layer may be determined based at least in part on measurement values associated with the positioning reference signals, such that the single measurement report includes an indication of the preferred positioning frequency layer. A positioning frequency layer in the number of positioning frequency layers may include positioning reference signal resources associated with a plurality of network nodes. The plurality of network nodes may include base stations configured to transmit positioning reference signals. The plurality of network nodes may include user equipment configured to transmit positioning reference signals.

An example method of selecting a positioning frequency layer for a positioning session according to the disclosure includes receiving capability information including an indication of a number of positioning frequency layers a wireless node can support, providing a plurality of assistance data messages to the wireless node in a sequential order based on the number of positioning frequency layers the wireless node can support, receiving a sequence of measurement reports from the wireless node, wherein each of the measurement reports is associated with one of the plurality of assistance data messages and is received before a next assistance data message of the plurality of assistance data messages is provided to the wireless node, determining a preferred positioning frequency layer based on the sequence of measurement reports, and requesting positioning measurements from the wireless node based on the preferred positioning frequency layer.

Implementations of such a method may include one or more of the following features. The indication of the number of positioning frequency layers the wireless node can support further may include an indication of at least one wireless protocol. The indication of the at least one wireless interface may include an indication associated with a Uu protocol or an indication associated with a sidelink protocol. Determining the preferred positioning frequency layer may be based at least in part on a number of positioning reference signals measured in the preferred positioning frequency layer. Determining the preferred positioning frequency layer may be based at least in part on a number of line of sight measurements obtained in the preferred positioning frequency layer. One or more non-preferred positioning frequency layers may be deactivated on one or more neighboring base stations.

An example apparatus according to the disclosure includes a memory, at least one transceiver, at least one processor communicatively coupled to the memory and the at least one transceiver, and configured to provide capabilities information including an indication of a number of positioning frequency layers to be included in a single measurement report, and an indication of a number of positioning frequency layers that can be measured simultaneously, receive positioning assistance data comprising positioning reference signal configuration information, measure positioning reference signals in the number of positioning frequency layers to be included in the single measurement report based at least in part on the positioning assistance data, and transmit the single measurement report.

An example apparatus according to the disclosure includes a memory, at least one transceiver, at least one processor communicatively coupled to the memory and the at least one transceiver, and configured to receive capability information including an indication of a number of positioning frequency layers a wireless node can support, provide a plurality of assistance data messages to the wireless node in a sequential order based on the number of positioning frequency layers the wireless node can support, receive a sequence of measurement reports from the wireless node, wherein each of the measurement reports is associated with one of the plurality of assistance data messages and is received before a next assistance data message of the plurality of assistance data messages is provided to the wireless node, determine a preferred positioning frequency layer based on the sequence of measurement reports, and request positioning measurements from the wireless node based on the preferred positioning frequency layer.

Items and/or techniques described herein may provide one or more of the following capabilities, as well as other capabilities not mentioned. A wireless node, such as a user equipment, may provide an indication of the number of positioning frequency layers (PFLs) it is capable of utilizing in a PFL discovery phase and a PFL measurement phase of a positioning session. A network entity, such as a location server, may provide positioning assistance data to the wireless node based on the node's capabilities. The assistance data may include positioning reference signal information for one or more PFLs. The wireless node may be configure to obtain PRS measurements in one or more PFLs in the discovery phase. A preferred PFL may be determined based on the PRS measurements. The location server may activate the preferred PFL and deactivate non-preferred PFLs. The preferred PFL may be used during the measurement phase of the positioning session. The accuracy of position estimates may be improved, and the time to obtain a position estimate may be reduced. Other capabilities may be provided and not every implementation according to the disclosure must provide any, let alone all, of the capabilities discussed.

DETAILED DESCRIPTION

Techniques are discussed herein for utilizing positioning reference signals (PRS) to determine a location of a wireless node. PRS are defined in 5G NR positioning to enable wireless nodes such as user equipment (UEs) and base stations (BSs) to detect and measure signals transmitted by neighboring network nodes. Several PRS configurations are supported to enable a variety of deployments, such as indoor, outdoor, sub-6 GHz, and millimeter wave (mmW), and to support both UE assisted and UE based position calculations. In an example, PRS resources may be utilized as data structures to define parameters associated with a PRS. A PRS resource set may include a set of PRS resources, and a positioning frequency layer (PFL) may be a collection of PRS resource sets across one or more network nodes. In an embodiment, the PRS resources in a PFL maybe sorted in a decreasing order of priority measurement to be performed by a wireless node (e.g., a UE). In an example, up to 64 PRS in the PFL may be sorted based on a priority, and up to 2 PRS resource sets in the PFL may be sorted according to a priority. A wireless node may be configured to support one PFL per location session, but the neighboring stations may be configured to transmit PRS on multiple PFLs. There is a need to enable a wireless node to select a PFL which will enable satisfactory positioning accuracy. In a PFL discovery phase, a network server may provide assistance data including PRS resource information for a plurality of PFLs, and a wireless node may be configured to obtain PRS measurement values for PRS in multiple PFLs. In an example, the PFLs may be based on downlink (DL) PRS resources, sidelink (SL) PRS resources, or combinations of DL and SL PRS resources. The wireless node, or other network resource, may be configured to select one or more PFLs based on the PRS measurement values. The selected PFLs may be used in a subsequent PFL measurement phase such that the wireless node will utilize the selected PFLs for the remainder of a positioning session. Utilizing the selected PFLs may reduce the latency associated with determining a position of the wireless node, and may improve the accuracy of the associated position estimate. These techniques and configurations are examples, and other techniques and configurations may be used.

Figure 1:
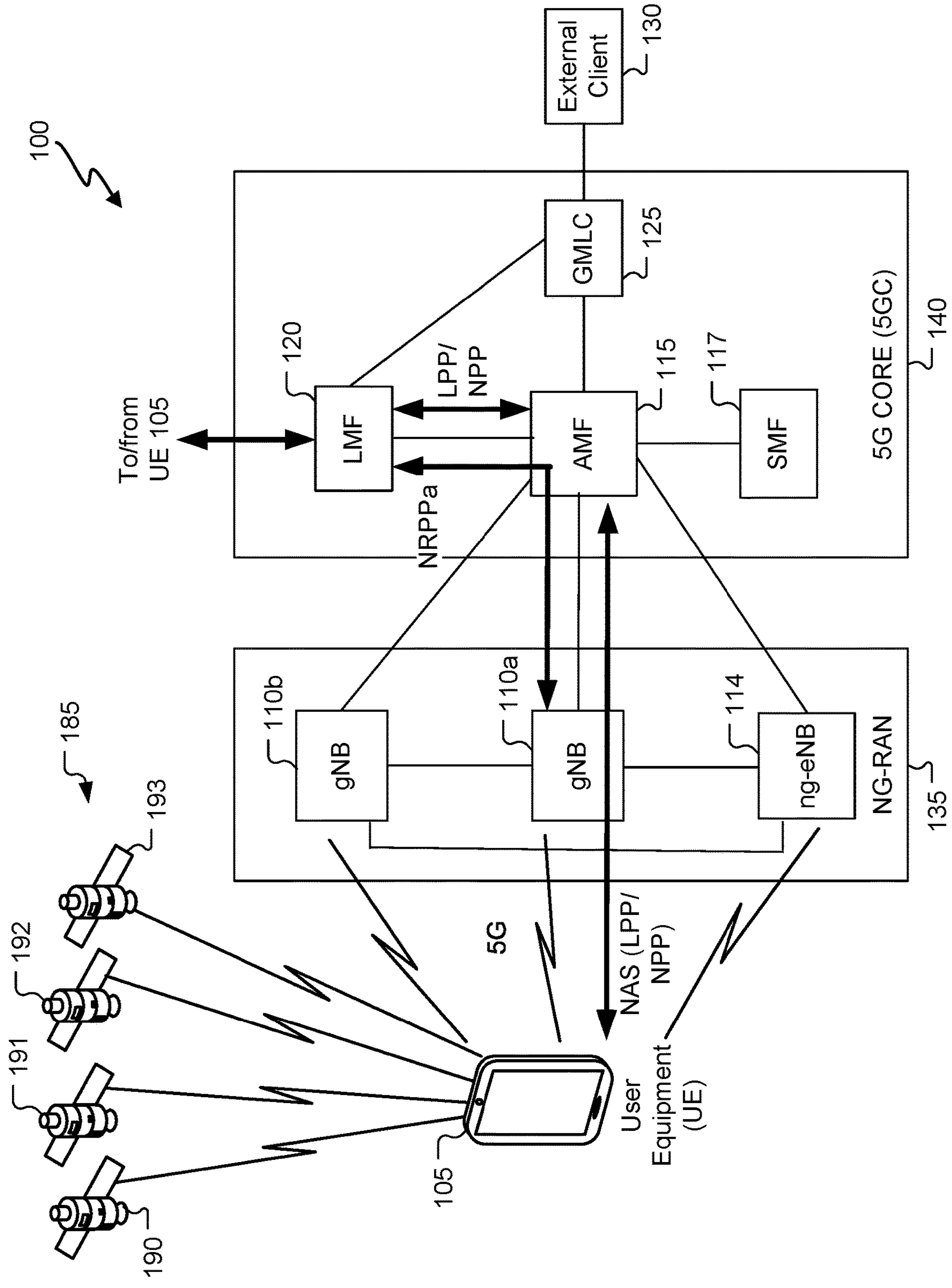
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a consumer asset tracking device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable health trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links (e.g., sidelinks). The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs (e.g., gNB 110*a*, gNB 110*b*, ng-eNB 114) may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
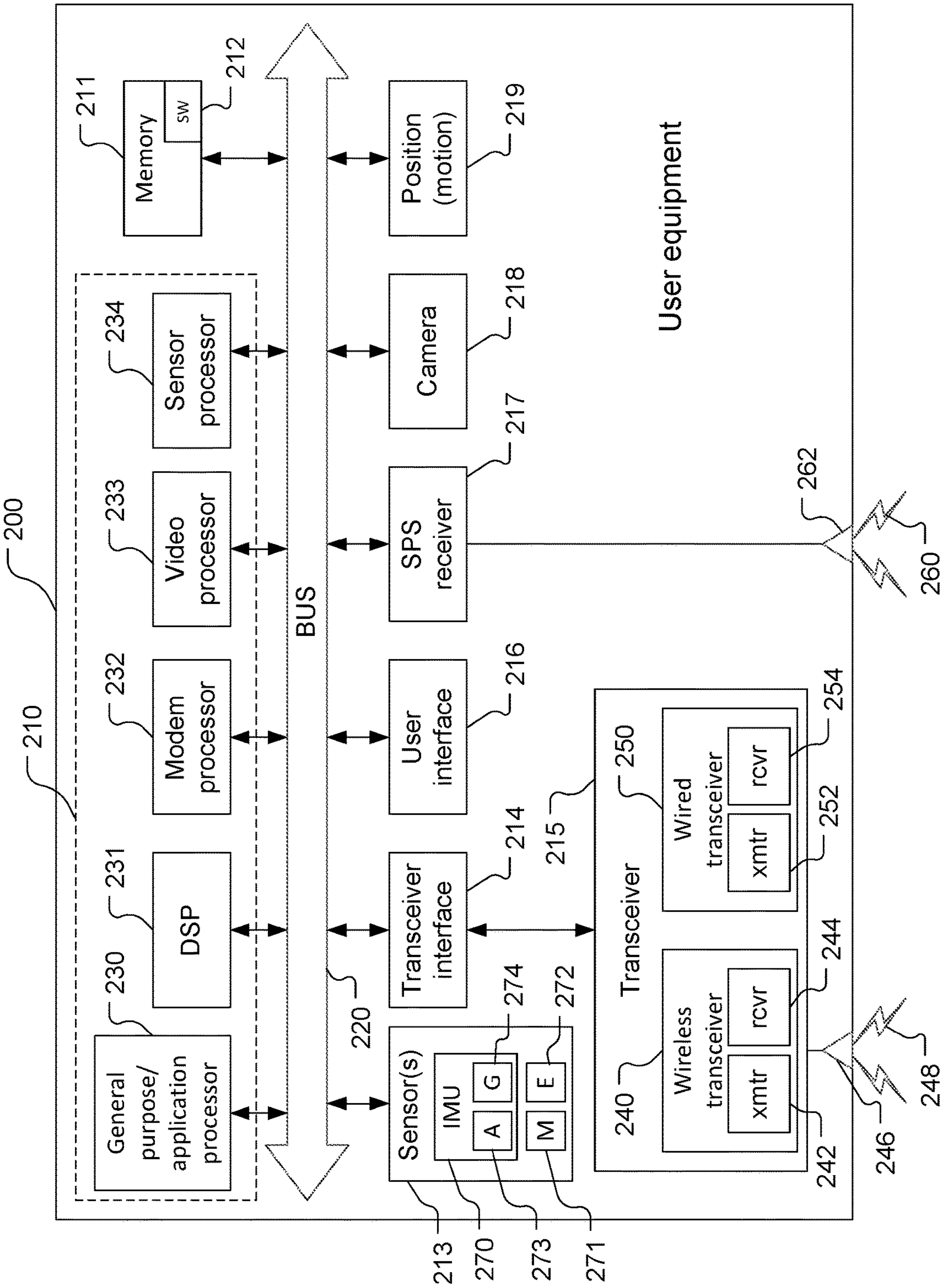
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device (PMD) 219. The processor 210, the memory 211, the sensor(s) 213, the transceiver interface 214, the user interface 216, the SPS receiver 217, the camera 218, and the position (motion) device (PMD) 219 may be communicatively coupled to each other by a bus 220 (which may be configured, e.g., for optical and/or electrical communication). One or more of the shown apparatus (e.g., the camera 218, the position (motion) device (PMD) 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to obtain a location of the UE 200. For example, a reference location of the UE 200 may be determined, e.g., using the SPS receiver 217 (and/or by some other means) for a moment in time and measurements from the accelerometer (s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X) (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB **110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215**.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200.

For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
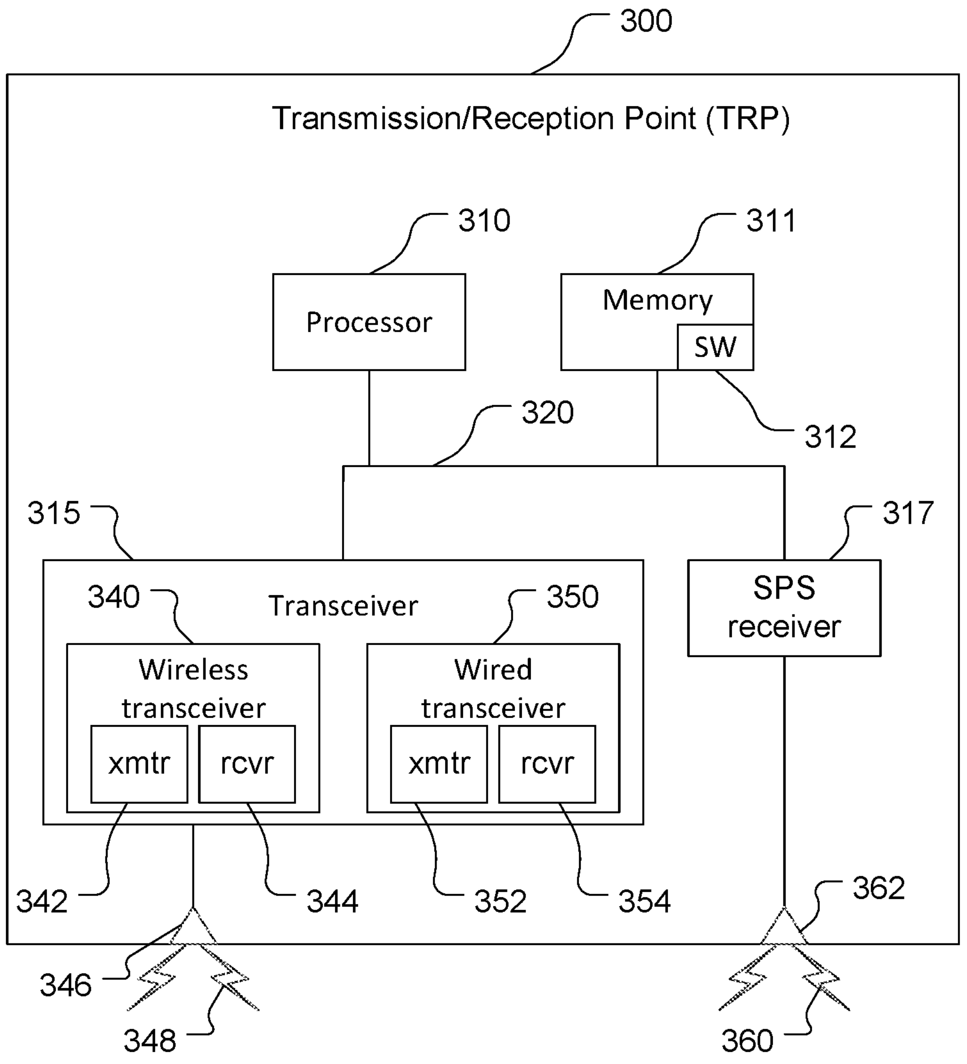
FIG. 3 is a block diagram of components of an example transmission/reception point.

Referring also to FIG. 3, an example of a TRP 300 of the BSs (e.g., gNB 110*a*, gNB 110*b*, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110*a*, gNB 110*b*, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels, downlink channels, and/or sidelink channels) and/or receiving (e.g., on one or more downlink channels, uplink channels, and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
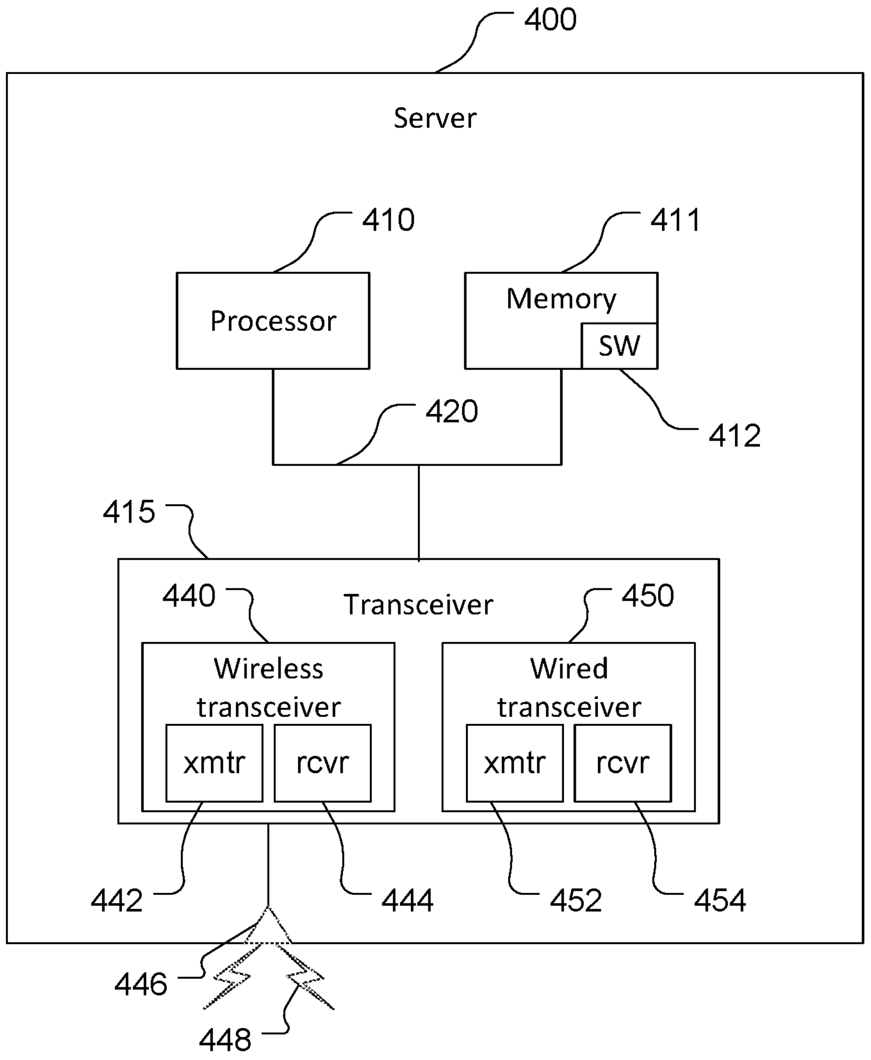
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
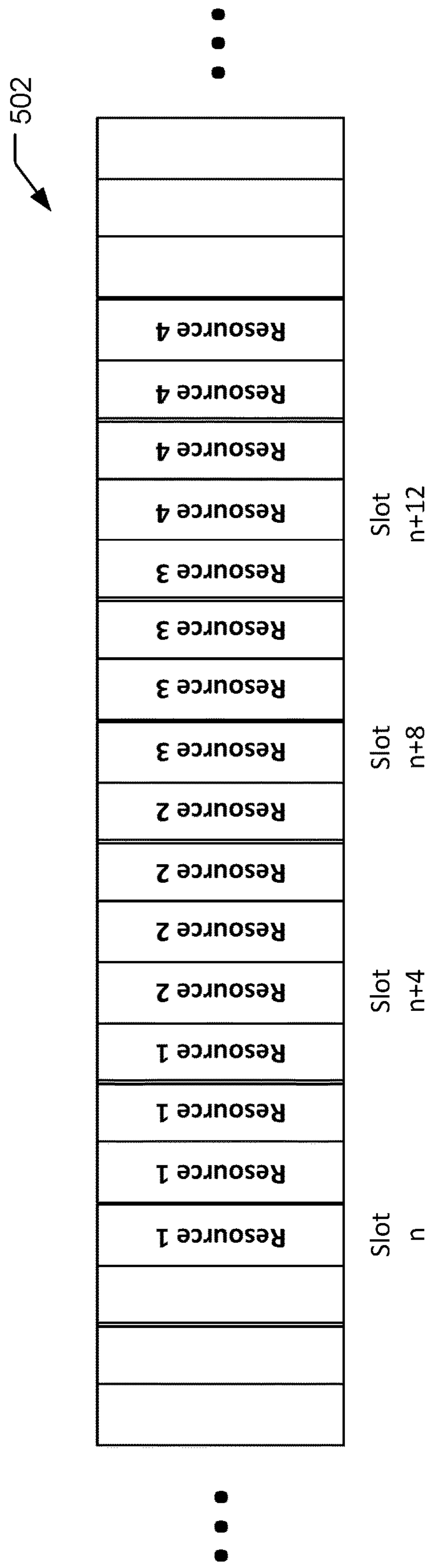
FIGS. 5A and 5B illustrate example downlink positioning reference signal resource sets.
Figure 5B:
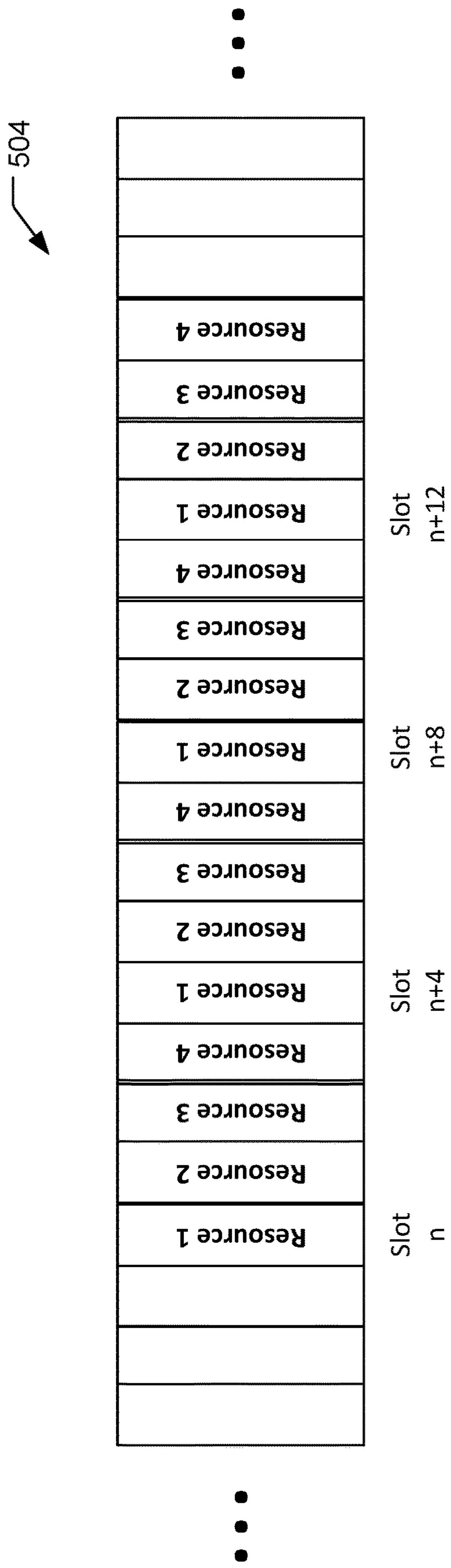

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
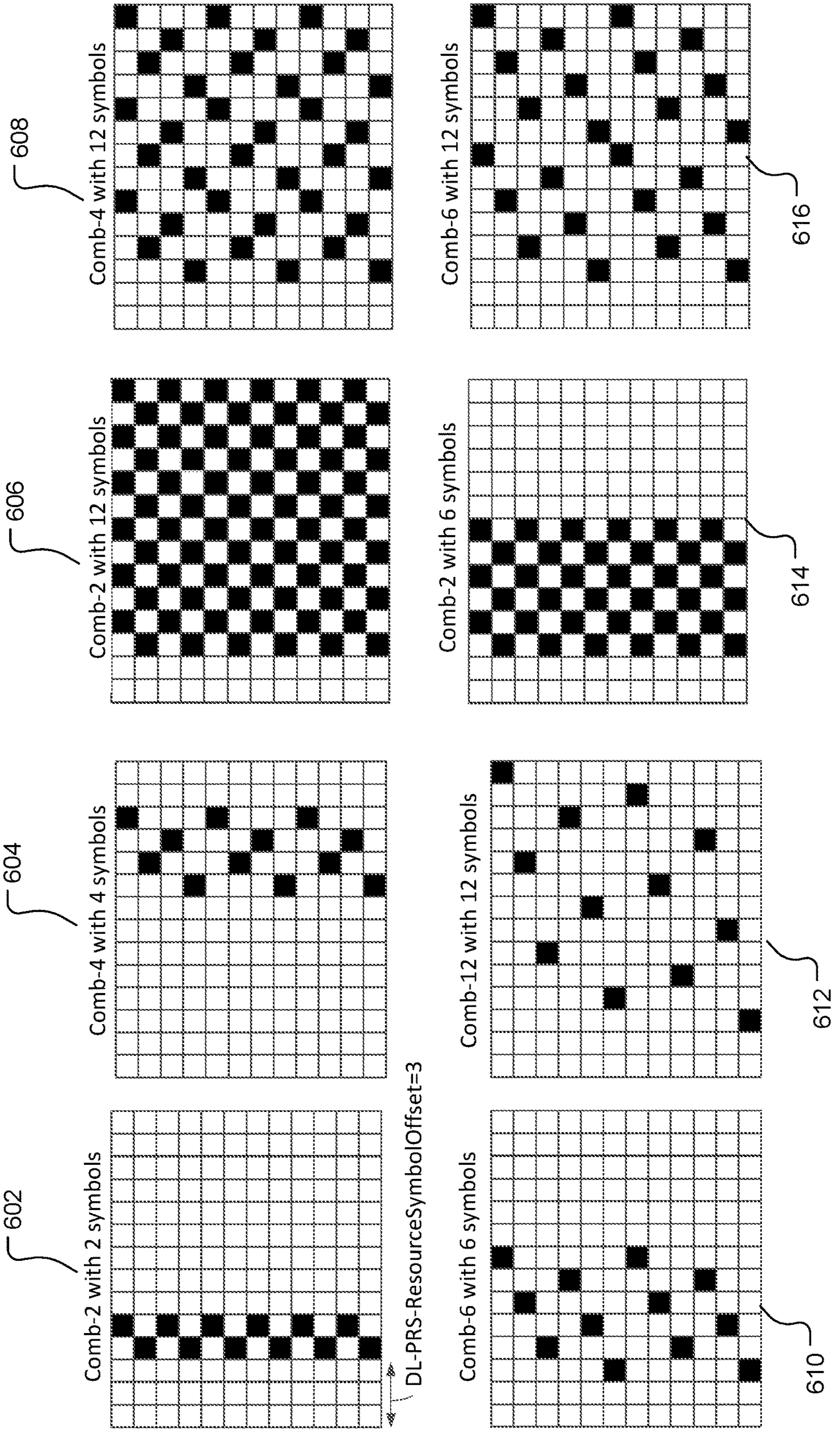
FIG. 6 is an illustration of example subframe formats for positioning reference signal transmissions.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
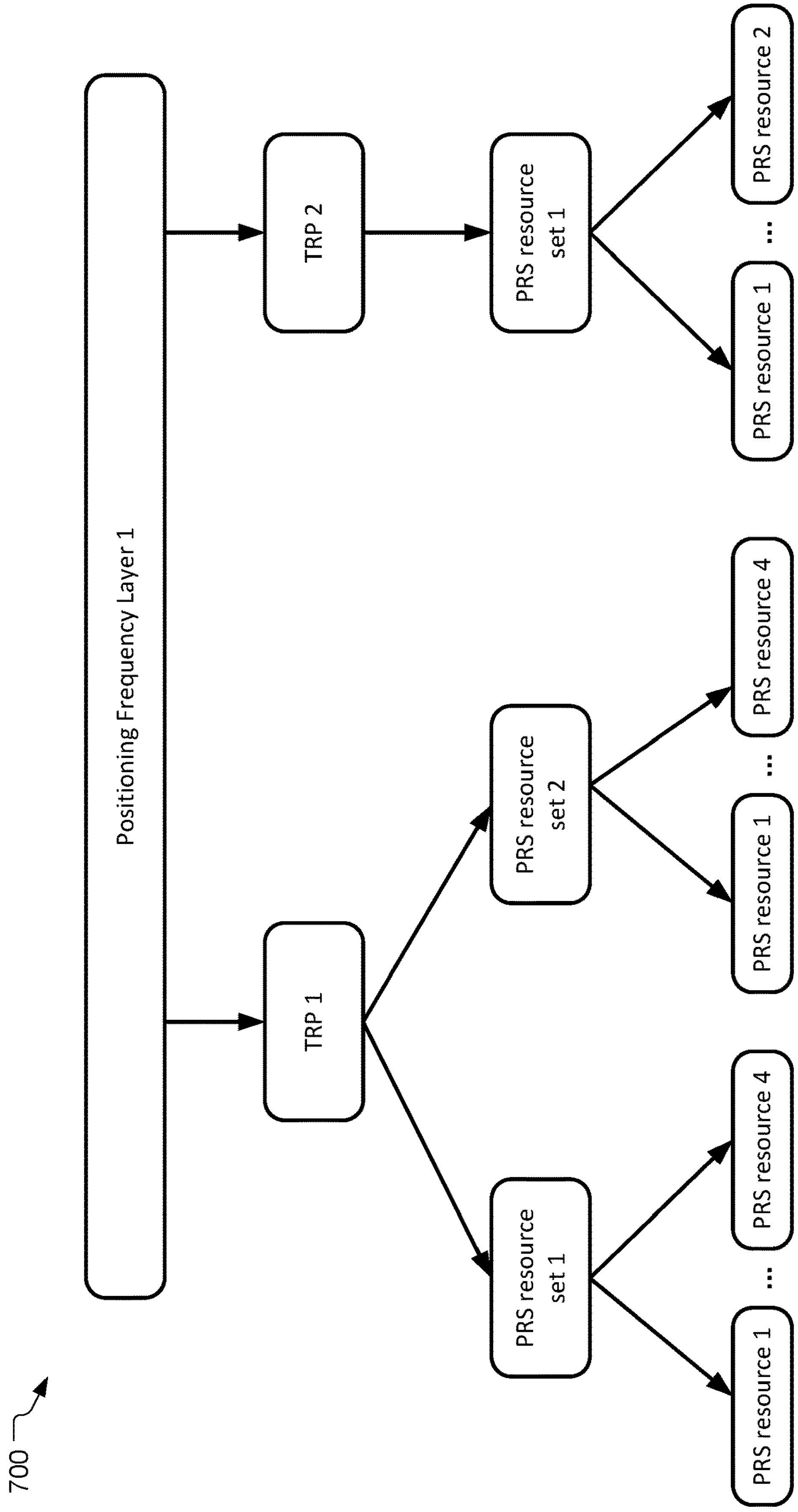
FIG. 7 is a diagram of an example position frequency layer.

Referring to FIG. 7, a diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), sidelink positioning reference signals (SL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz. A UE may be configured to support additional positioning frequency layers (e.g., 2, 3, 4, etc) such that each positioning frequency layer may comprise different PRS resources, different PRS resource sets, and/or different combinations of PRS resources and PRS resource sets.

Figure 8A:
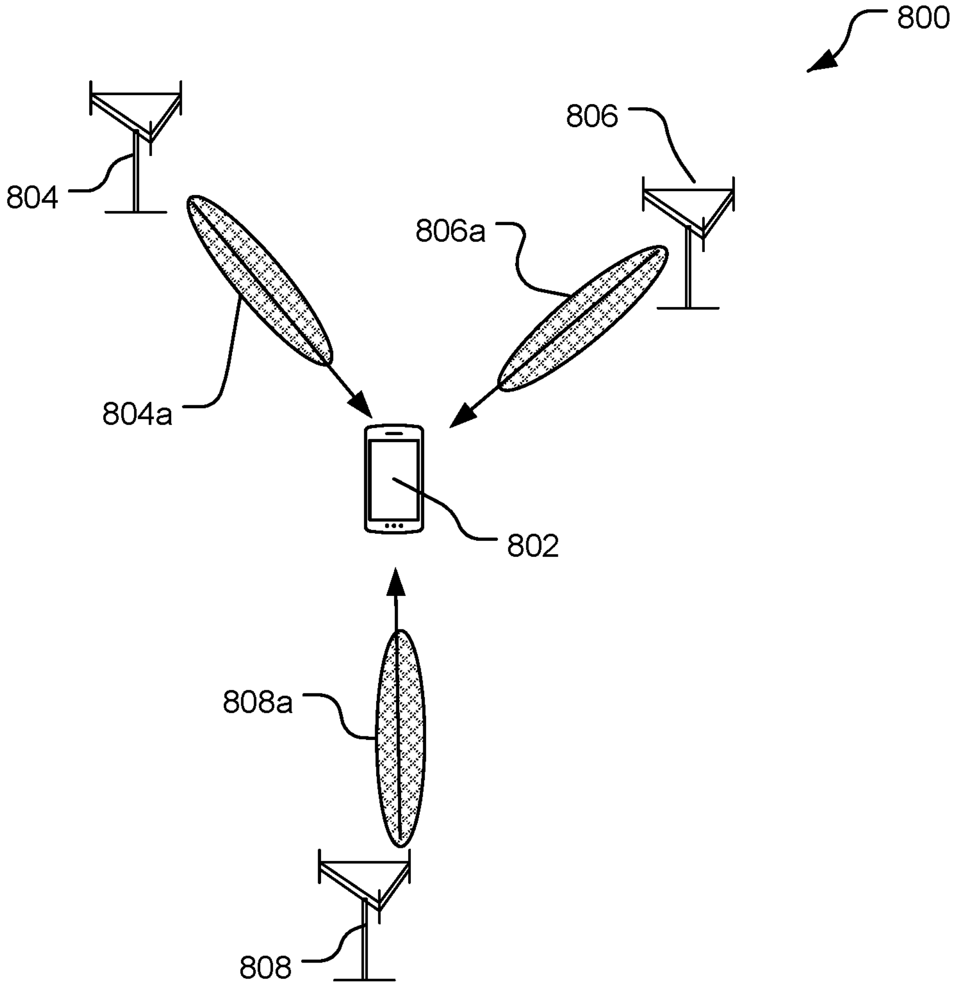
FIG. 8A is a diagram of a user equipment receiving a plurality of downlink positioning reference signals.

Referring to FIG. 8A, a diagram 800 of a UE 802 receiving downlink positioning reference signals is shown. The diagram 800 depicts the UE 802 and a plurality of base stations including a first base station 804, a second base station 806, and a third base station 808. The UE 802 may have some or all of the components of the UE 200, and the UE 200 may be an example of the UE 802. Each of the base stations 804, 806, 808 may have some or all of the components of the TRP 300, and the TRP 300 may be an example of one or more of the base stations 804, 806, 808. In operation, the UE 802 may be configured to receive one or more reference signals such as a first reference signal 804*a*, a second reference signal 806*a*, and a third reference signal 808*a*. The reference signals 804*a*, 806*a*, 808*a* may be DL PRS or other positioning signals which may be received/measured by the UE 802. The reference signals 804*a*, 806*a*, 808*a* may be based on the PRS resources indicated in the positioning frequency layer 700. In an example, the reference signals 804*a*, 806*a*, 808*a* may be transmitted via the 5G NR Uu interface. While the diagram 800 depicts three reference signals, fewer or more reference signals may be transmitted by the base stations and detected by the UE 802. In general, DL PRS signals in NR may be configured reference signals transmitted by the base stations 804, 806, 808 and used for the purpose of determining respective ranges between the UE 802 and the transmitting base stations. The UE 802 may also be configured to transmit uplink PRS (UL PRS, SRS for positioning) to the base stations 804, 806, 808, and the base stations may be configured to measure the UL PRS. In an example, combinations of DL and UL PRS may be used in a positioning procedure (e.g., RTT).

Figure 8B:
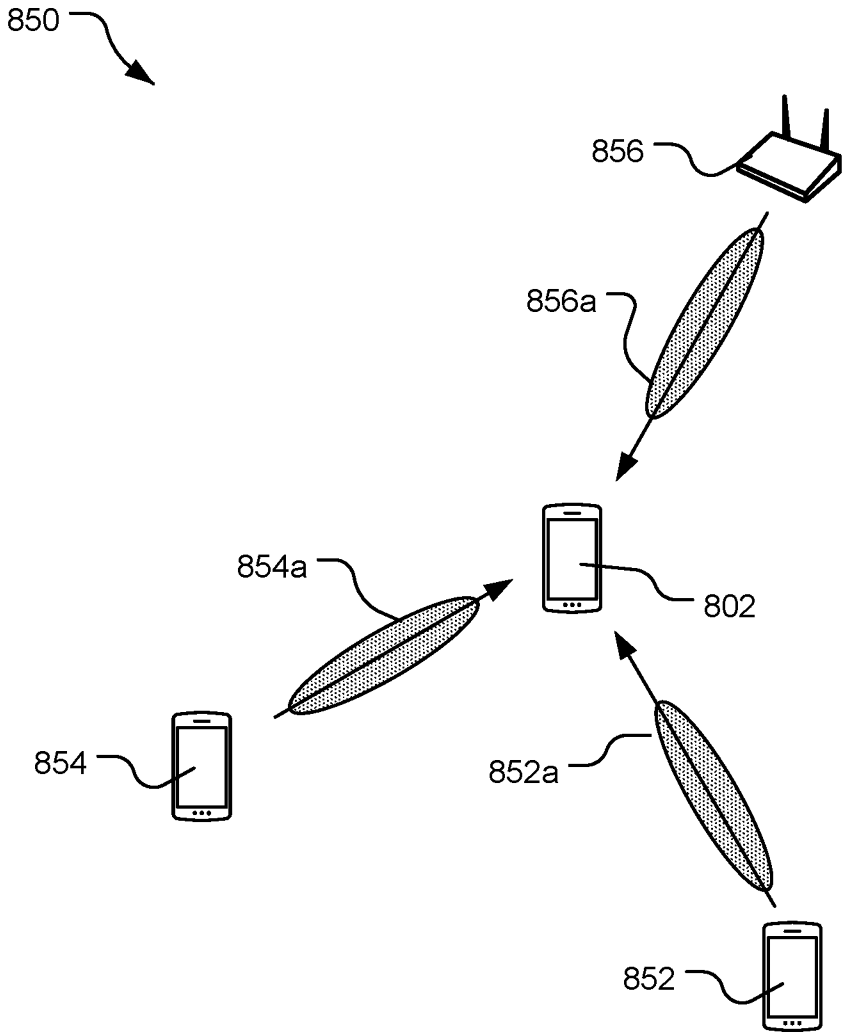
FIG. 8B is a diagram of a user equipment receiving a plurality of sidelink positioning reference signals.

Referring to FIG. 8B, a diagram 850 of the UE 802 receiving sidelink positioning reference signals is shown. The diagram 850 depicts the UE 802 and a plurality of neighboring stations including a first neighbor UE 852, a second neighbor UE 854, and a third neighbor station 856. Each of the UE 802 and the neighbor UEs 852, 854 may have some or all of the components of the UE 200, and the UE 200 may be an example of the UE 802 and the neighbor UEs 852, 854. The station 856 may have some or all of the components of the TRP 300, and the TRP 300 may be an example of the station 856. In an embodiment, the station 856 may be a roadside unit (RSU) in a V2X network and may be configured to communicate with the UE 802 via sidelink (SL) such as the PC5 interface. In operation, the UE 802 may be configured to receive one or more SL reference signals 852*a*, 854*a*, 856*a* via a SL channel such as the Physical Sidelink Shared Channel (PSSCH), Physical Sidelink Control Channel (PSCCH), Physical Sidelink Broadcast Channel (PSBCH), Sidelink Shared Channel (SL-SCH) or sidelink channels and other D2D interfaces. In an example, the reference signals may utilize a D2D interface such as the PC5 interface. The reference signals 852*a*, 854*a*, 856*a* may be SL PRS transmitted by one or more of the neighboring UEs 852, 854 or the station 856. While the diagram 850 depicts three reference signals, fewer or more reference signals may be transmitted by the UEs 852, 854 and/or the station 856. In an embodiment, the SL reference signals 852*a*, 854*a*, 856*a* may be SL PRS and may be included in the positioning frequency layer 700 as a SL PRS resource set. In an example, exchanges of SL PRS transmissions between stations may be used in various positioning procedures such as RTT, Rx-Tx, RSTD, TDoA, and other techniques as known in the art.

Figure 9A:
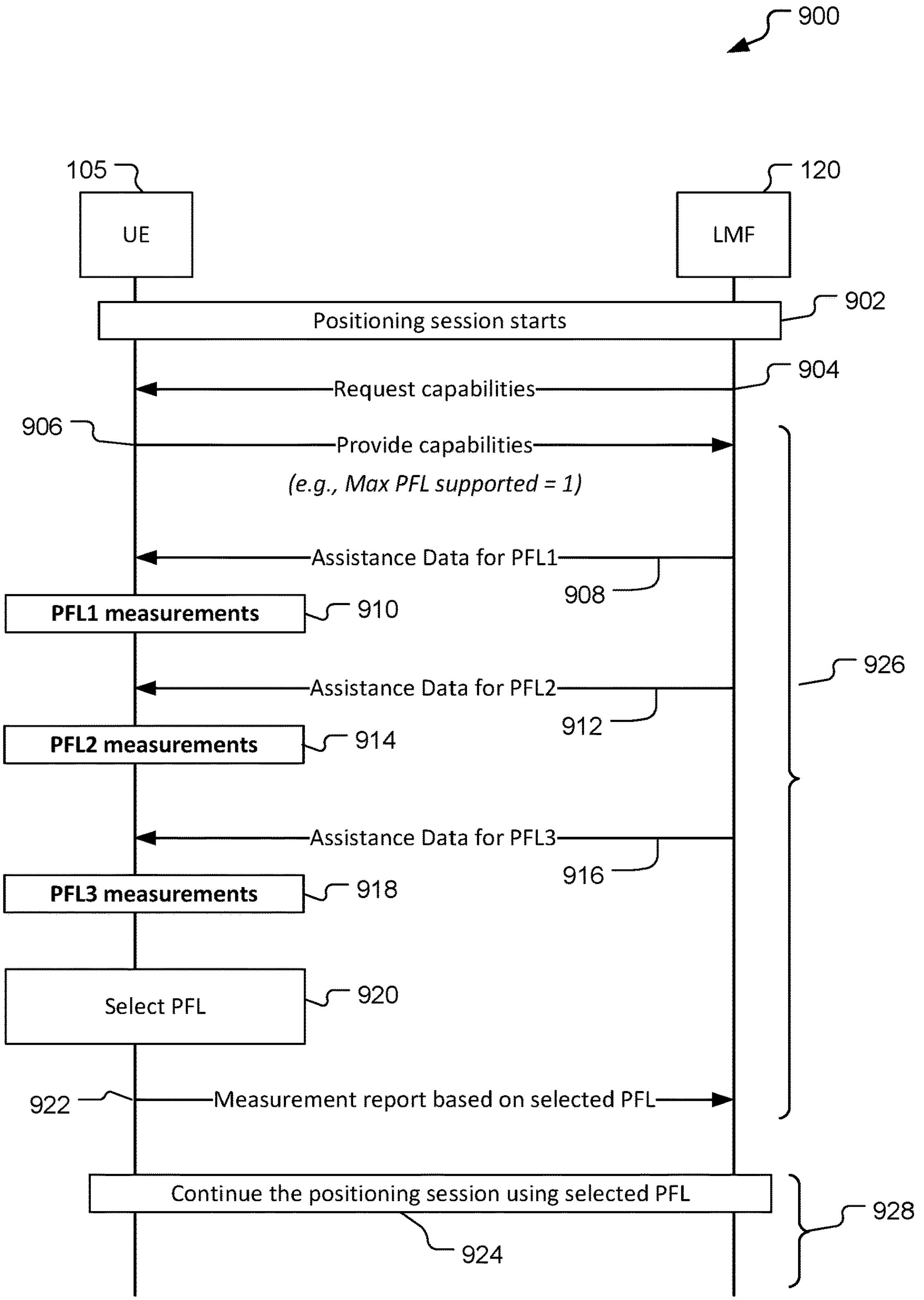
FIGS. 9A and 9B are example signal flow diagrams of sequential positioning frequency layer discovery processes.
Figure 9B:
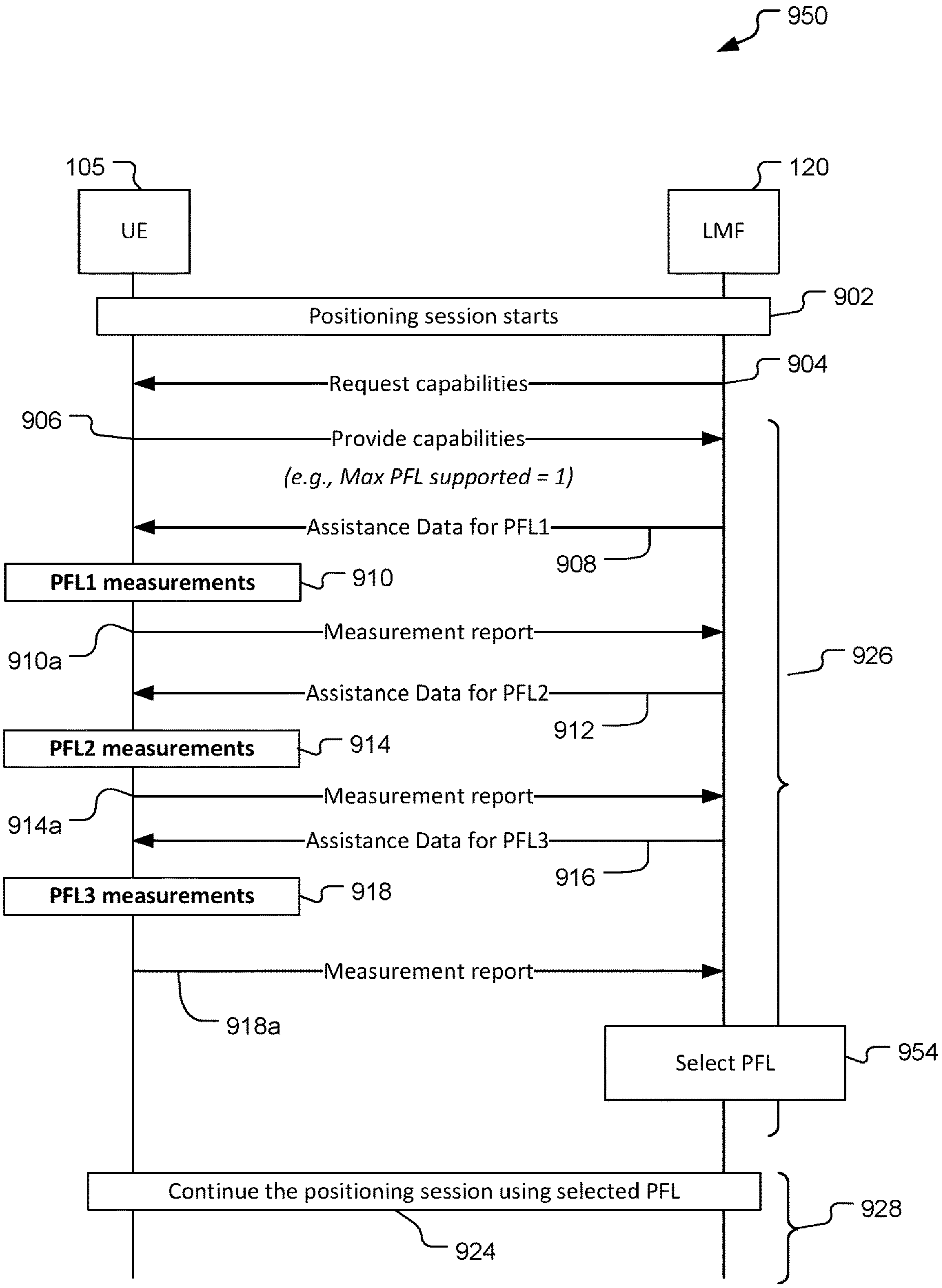

Referring to FIGS. 9A and 9B, example signal flow diagrams of sequential positioning frequency layer discovery processes are shown. In a first signal flow 900 depicted in FIG. 9A, a wireless node, such as the UE 105, and a network server, such as the LMF 120, may initiate a positioning session at stage 902. The first signal flow 900 includes a PFL discovery phase 926 and a PFL measurement phase 928. In the PFL discovery phase 926, the LMF 120 may provide a request capabilities message 904 via a network protocol such as LPP/NPP to obtain information from the UE 105 regarding the number of PFLs the UE 105 may support. In an example, PFL and PRS resource information may be provided to network stations via one or more system information blocks (SIBs) transmitted via Radio Resource Control (RRC) signaling. In an example, the UE 105 may send a provide capabilities message 906 including an indicate of a number of PFLs it is capable of supporting. In the example of FIG. 9A, the maximum number of PFLs the UE 105 is capable of supporting is 1. The LMF 120 may provide a series of assistance data messages including information about the positioning frequency layers the UE 105 may utilize for positioning (e.g., based on the configurations of the PRS resources on neighboring stations). The assistance data may include PRS resource parameters or index values associated with PFL and/or PRS resource information transmitted via RRC. In an example, a first assistance data 908 may include PRS configuration information associated with a first PFL (e.g., PFL1). After receiving the first assistance data 908, the UE 105 may obtain PRS measurements based on the first PFL at stage 910. The LMF 120 is configured to send additional assistance data associated with other PFLs, such as a second assistance data 912 for a second PFL (e.g., PFL2), and a third assistance data 916 associated with a third PFL (e.g., PFL3). The UE 105 is configured to obtain PRS measurements based on the second PFL at stage 914, and the third PFL at stage 918 as depicted in the first signal flow 900. In an embodiment, at stage 920 the UE 105 is configured to determine a preferred PFL based on the measurements obtained in the previous stages 910, 914, 918. In an example, the preferred PFL may be based on one or more performance indicators associated with the measurements, such as the number of TRPs/PRS resources that are detected in each of the PFLS, or a quality of the measurements (e.g., RSTD, UE Rx-Tx), or indications of line of sight (LOS)/non line of sight (NLOS) for the PRS, or combinations of the performance indicators. The UE 105 may provide one or more measurement report messages 922 based on the preferred PFL selected at stage 920. The measurement report messages 922 may include the measurement values of the PRS from the preferred PFL (e.g., just one PFL). In the PFL measurement phase 928, the LMF 120 may configure neighboring stations to provide PRS using the preferred PFL. At stage 924, the positioning session continues based on the preferred PFL.

In an embodiment, the UE 105 may be configured to select the preferred PFL based on a priority value of the PRS resources in the PFLs, and report the measurements obtained with the PFL with the highest priority. In an example, a legacy UE may be configured to measure the first PFL (e.g. PFL1) because it was received first and then ignore the PRS transmitted in the subsequent PFLs.

Referring to FIG. 9B, a second signal flow 950 for sequential positioning frequency layer discovery is similar to the first signal flow 900 in FIG. 9A when the LMF 120 is configured to determine the preferred PFL. For example, the UE 105 may obtain PRS measurements for the first PFL at stage 910 and then send a first measurement report message 910*a* based on the first PFL measurements. The UE 105 may also send a second measurement report message 914*a* based on the PRS measurement values associated with PFL2 obtained at stage 914, and a third measurement report message 918*a* based on the PRS measurement values associated with PFL3 obtained at stage 918. At stage 954, the LMF 120, or other network entity, may determine a preferred PFL for the UE 105 based on the measurement report messages 910*a*, 914*a*, 918*a*. The PFL measurement phase 928 may continue based on the PFL selected at stage 954.

Figure 10A:
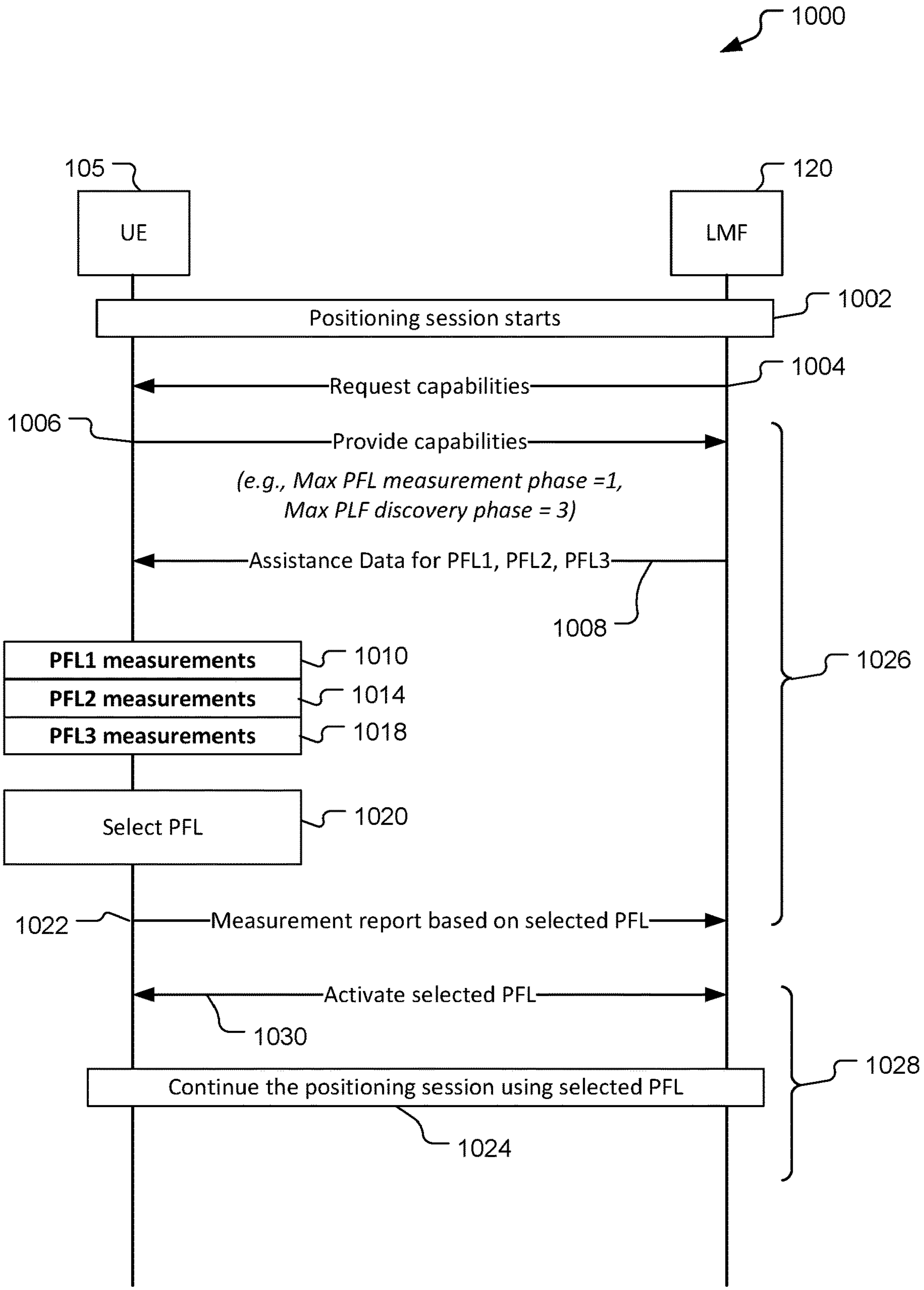
FIGS. 10A and 10B are example signal flow diagrams of positioning frequency layer discovery processes based on the capabilities of a wireless node.
Figure 10B:
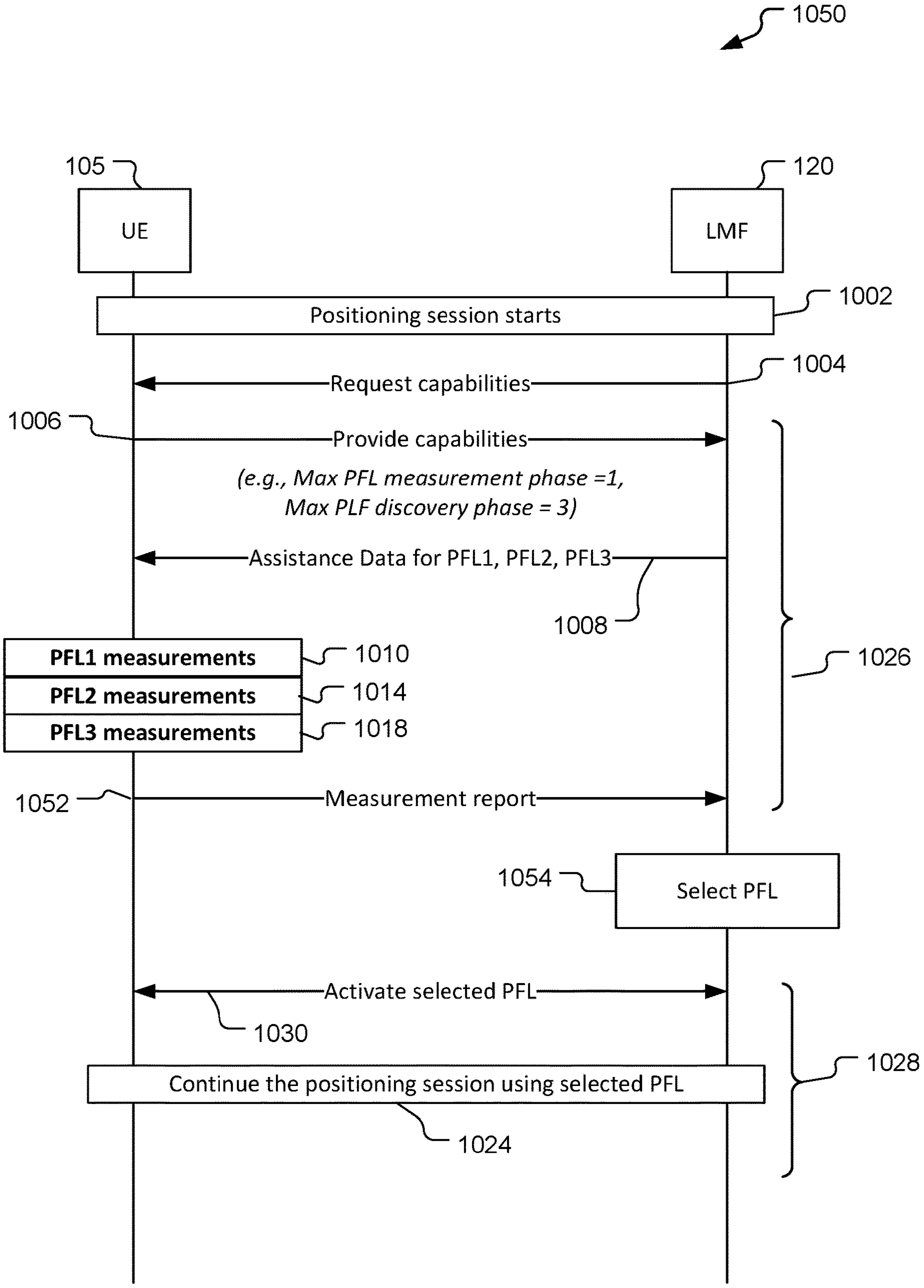

Referring to FIGS. 10A and 10B, example signal flow diagrams of positioning frequency layer discovery processes based on the capabilities of a wireless node are shown. In a first signal flow 1000 depicted in FIG. 10A, a wireless node, such as the UE 105, and a network server, such as the LMF 120, initiate a positioning session at stage 1002. The first signal flow 1000 includes a PFL discovery phase 1026 and a PFL measurement phase 1028. In the PFL discovery phase 1026, the LMF 120 may provide a request capabilities message 1004 via a network protocol such as LPP/NPP to obtain information from the UE 105 regarding the number of PFLs the UE 105 may support. In this example, the UE 105 may be configured to support multiple PFLs during the discovery phase (e.g., 3) and a single PFL in the measurement phase. In an example, the number of PFLs the UE 105 can support in the discovery phase may be interpreted as the total number of frequency layers the UE 200 can measure, or the total number of frequency layers the UE 200 can receive in assistance data. The number of PFLs supported in each of the phases may vary based on the capabilities of a UE and other factors such as industry standards. In an example, a UE may be configured to support additional PFLs (e.g., 4, 6, 8, etc.). The UE 105 may send one or more provide capabilities messages 1006 to indicate it can support 3 PFLs in the PFL discovery phase 1026, and one PFL in the PFL measurement phase 1028. The LMF 120, or other network entity, may utilize the content of the provide capabilities message 1006 to generate assistance data for the UE 105. For example, the LMF 120 may provide one or more assistance data messages 1008 including PRS resource information associated with three PFLs (e.g., PFL1, PFL2, PFL3). In an example, the assistance data messages 1008 may include index or other identification values associated with the PRS resources and/or the PFLs. The assistance data messages 1008 may be provided via LPP, RRC, or other signaling methods. In an example, the assistance data may be include in one or more SIBs transmitted from a gNB. The UE 105 is configured to obtain measurement values for PRS in each of the PFLs. For example, measurement values associated with PFL1 are obtained at stage 1010, measurement values associated with PFL2 are obtained at stage 1014, and measurement values associated with PFL3 are obtained at stage 1018. The PRS in the different PFLs may be measured with equal priority. The number and order of the measurement stages 1010, 1014, 1018 are examples and not limitations. A different number of stages may be used based on the capabilities of the UE (e.g., as indicated to the LMF in the provide capabilities messages 1006). The UE 105 is configured to select a preferred PFL at stage 1020 based on the measurements. In an example, the preferred PFL may be based on one or more performance indicators associated with the measurements, such as the number of TRPs/PRS resources that are detected in each of the PFLS, or a quality of the measurements (e.g., RSTD, UE Rx-Tx), or indications of LOS/NLOS for the PRS, or combinations of the performance indicators. The UE 105 may provide one or more measurement report messages 1022 based on the preferred PFL selected at stage 1020. The measurement report messages 1022 may include the measurement values of the PRS from the preferred PFL (e.g., just one PFL). In the PFL measurement phase 1028, the LMF 120 may activate the PFL selected at stage 1020 via one or more activation messages 1030 in neighboring stations to provide PRS to the UE 105 based on the preferred PFL. At stage 1024, the positioning session continues based on the preferred PFL.

Referring to FIG. 10B, a second signal flow 1050 for a positioning frequency layer discovery process is similar to the first signal flow 1000 in FIG. 10A when the LMF 120 is configured to determine the preferred PFL. For example, the UE 105 may obtain PRS measurements for the first PFL at stage 1010, PRS measurement values associated with PFL2 at stage 1014, and PRS measurement values associated with PFL3 at stage 1018. The UE 105 may provide one or more measurement report messages 1052 based on the measurements obtained at stages 1010, 1014, 1018. At stage 1054, the LMF 120, or other network entity, may determine a preferred PFL for the UE 105 based on the measurement report messages 1052. The LMF 120 may activate the selected in the PFL measurement phase 1028 and continue the positioning session based on the PFL selected at stage 1054.

In an example, when the UE 105 is configured to support X number of PFLs and receives assistance data including information for Y number of PFLs (where Y>X), the LMF 120 may provide PFL information in one or more location request messages to update the priority of processing the multiple PFLs in different ways. In a first example, the LMF 120 may instruct the UE 105 to measure all Y number of PFLs (e.g., in a TDM fashion) and report back measurements for all PFLs. In a second example, the UE 105 may be instructed to measure a single one of the Y number of PFLs (according to a priority value) and report the measurements. The UE 120 may be configured to measure the X number of the highest priority PFLs.

Figure 11A:
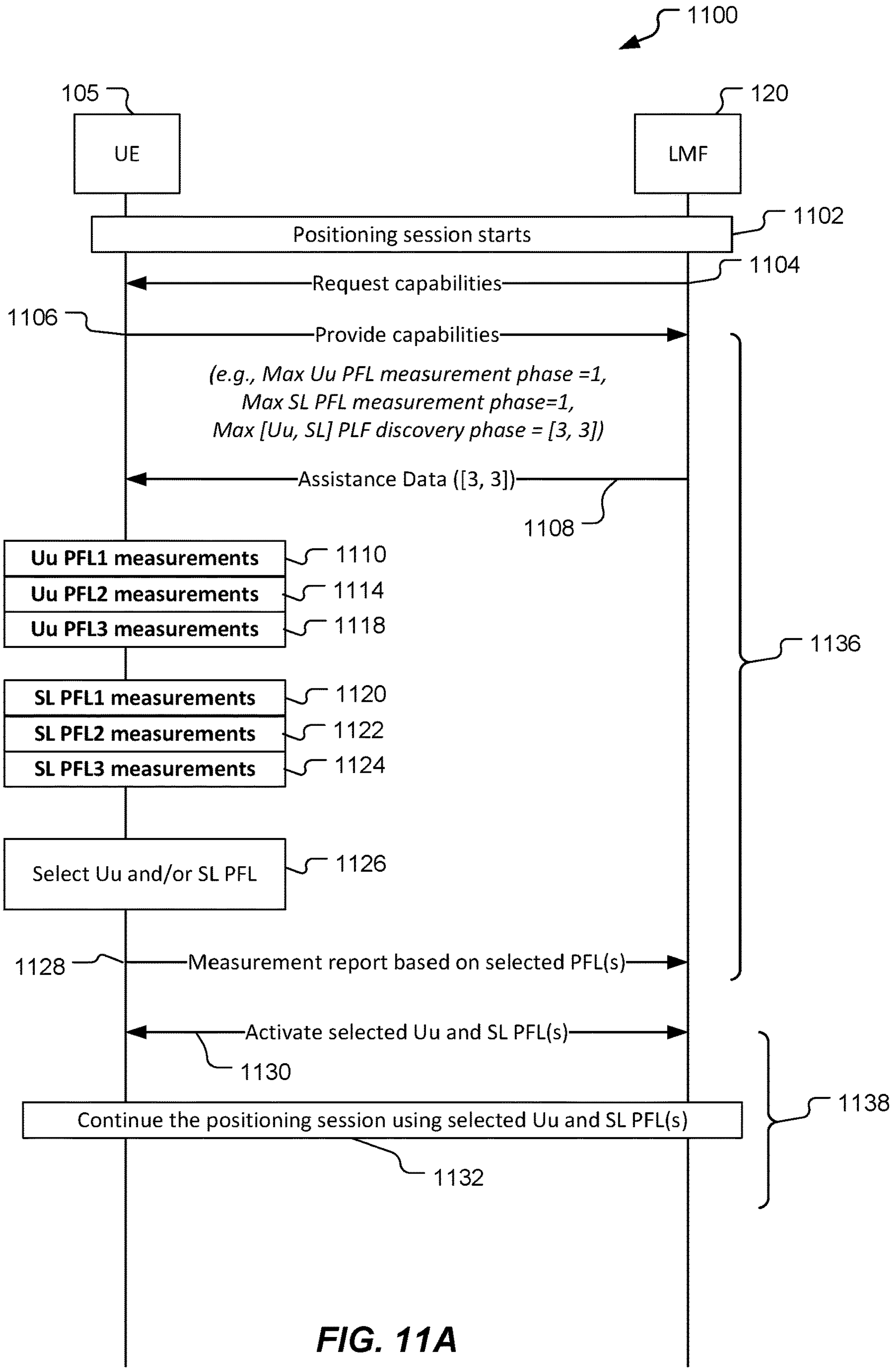
FIGS. 11A and 11B are example signal flow diagrams of positioning frequency layer discovery processes for multiple wireless protocols.
Figure 11B:
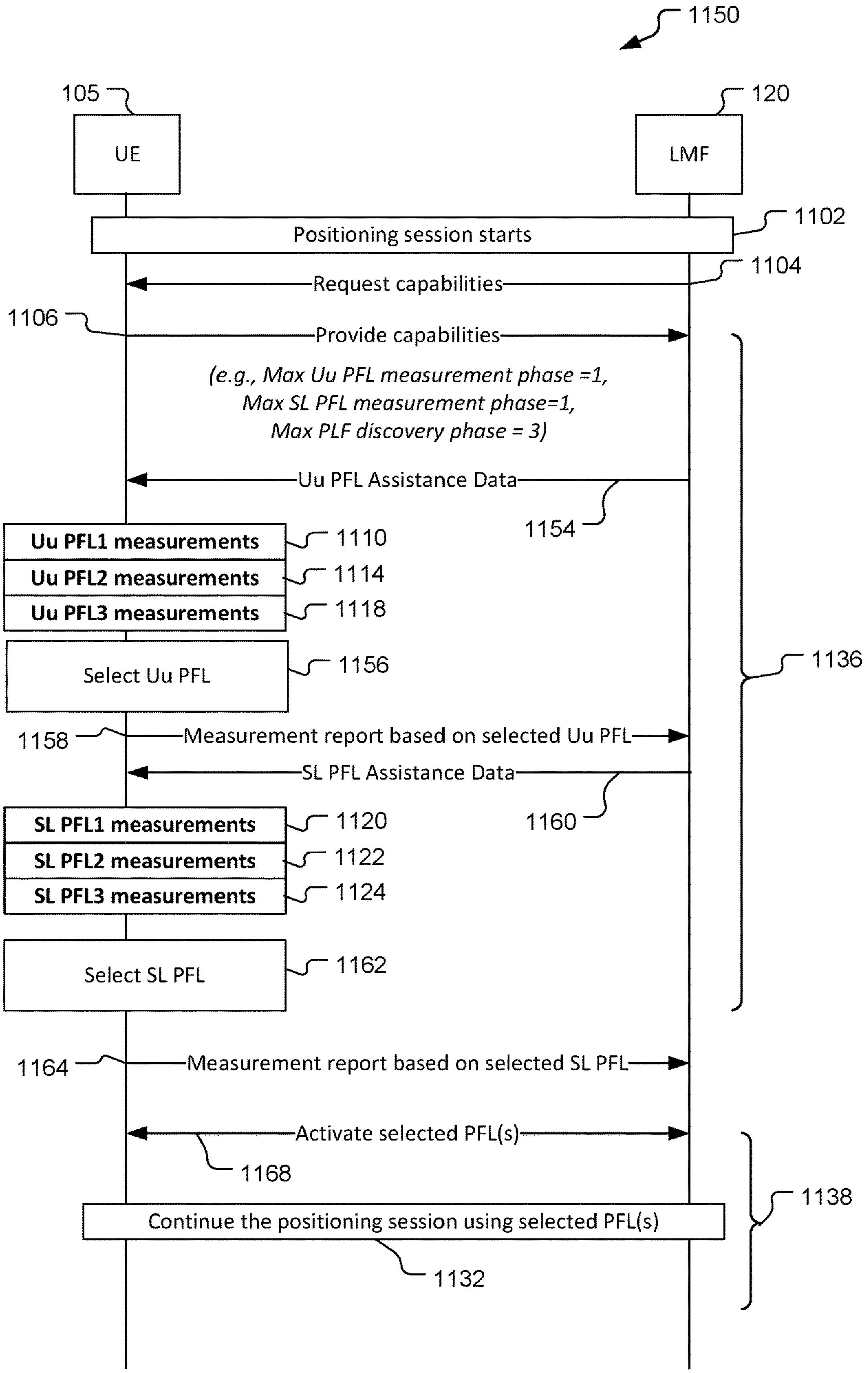

Referring to FIGS. 11A and 11B, example signal flow diagrams of positioning frequency layer discovery processes for multiple wireless protocols are shown. In a first signal flow 1100, a wireless node, such as the UE 105, and a network entity, such as the LMF 120, initiate a positioning session at stage 1102. The first signal flow 1100 includes a PFL discovery phase 1136 and a PFL measurement phase 1138. In the PFL discovery phase 1136, the LMF 120 may provide a request capabilities message 1104 via a network protocol such as LPP/NPP to obtain information from the UE 105 regarding the number of PFLs the UE 105 may support. In this example, the UE 105 may be configured to support multiple PFLs with multiple wireless protocols. For example, the UE 105 may be configured to receive DL PRS from base stations via the Uu interface such as described in FIG. 8A. The UE 105 may be configured to also receive SL PRS via a D2D interface (e.g., PC5) such as described in FIG. 8B. Other protocols and interfaces may also be used. In an example, the UE 105 may also be configured to transmit UL PRS (e.g., SRS for positioning) via the Uu interface, and transmit SL PRS to other wireless nodes (e.g., UEs, APs, RSUs) via the D2D interface. In the example in FIG. 11A, the UE 105 is capable of utilizing one Uu PFL and one SL PFL in the measurement phase 1138. The UE 105 is also configured to measure 3 Uu PFLs and 3 SL PFLs in the discovery phase 1136. The number of PFLs and protocols/interfaces the UE 105 is capable of receiving is an example, and not a limitation, as other combinations of numbers and protocols may also be used. The UE 105 sends one or more provide capabilities messages 1106 indicating it is capable of receiving 1 Uu PFL and 1 SL PFL in the measurement phase 1138, and 3 Uu PFLs and 3 SL PFLs (e.g., [3, 3]) in the discovery phase 1136. The LMF 120, or other network entity, may utilize the content of the provide capabilities message 1106 to generate assistance data for the UE 105. For example, the LMF 120 may provide one or more assistance data messages 1108 including PRS resource information associated with 3 Uu PFLs and 3 SL PFLs. In an example, the assistance data messages 1108 may include index or other identification values associated with the DL PRS and SL PRS resources and/or the Uu and SL PFLs.

The UE 105 may utilize the assistance data messages 1108 to obtain DL PRS measurements for PRS transmitted in a first Uu PFL at stage 1110, a second Uu PFL at stage 1114, and a third Uu PFL at stage 1118 with equal priority. The UE 105 may also utilize the assistance data messages 1108 to obtain SL PRS measurements for PRS transmitted in a first SL PFL at stage 1120, a second SL PFL at stage 1122, and a third SL PFL at stage 1124 with equal priority. The UE 105 may utilize the measurements to select preferred PFLs at stage 1126. In an example, the UE 105 may select a preferred Uu PFL and a preferred SL PFL based on one or more performance indicators associated with the measurements, such as the number of TRPs/PRS resources that are detected in each of the PFLs, or a quality of the measurements (e.g., RSTD, UE Rx-Tx), or indications of LOS/NLOS for the PRS, or combinations of the performance indicators for each respective interface/protocol. In an example, the UE 105 may select a single preferred PFL (e.g., either a Uu PFL or a SL PFL) based on the performance indicators.

The UE 105 may send one or more measurement report messages 1128 based on the selected PFL(s). In an example, the measurement report messages 1128 may indicate a preferred Uu PFL and a preferred SL PFL, or a single preferred PFL. The measurement report messages 1128 may include the measurement values obtained from the PRS in the selected PFL(s). The LMF 120 may be configured to active the preferred PFLs at stage 1130. In the PFL measurement phase 1138, the LMF 120 may activate the PFL(s) selected at stage 1162 via one or more activation messages 1130 in neighboring stations to provide DL PRS and/or SL PRS to the UE 105 based on the preferred PFL(s). At stage 1132, the positioning session continues based on the preferred PFL(s).

Referring to FIG. 11B, a second signal flow 1150 for a positioning frequency layer discovery process is similar to the first signal flow 1100 in FIG. 11A when the LMF 120 is configured to provide Uu and SL assistance serially in the discovery phase 1136. For example, the LMF 120 may provide one or more Uu PFL assistance data messages 1154 to enable the UE 105 to measure PRS in the first Uu PFL, the second Uu PFL, and the third Uu PFL and the respective stages 1110, 1114, 1118. The UE 105 may select a preferred Uu PFL at stage 1156, and provide one or more measurement report messages 1158 to the LMF 120 based on the selected Uu PFL. Upon receipt of the measurement report messages 1158, or other timing functions (e.g., time-out period), the LMF 120 may continue in the discovery phase 1136 and send one or more SL PFL assistance data messages 1160 based on the capabilities of the UE 105 (e.g., the provide capabilities messages 1106). The UE 105 may measure PRS in one or more SL PFLs based on the assistance data, such as the measurements obtained at stages 1120, 1122, 1124. The UE 105 may select a preferred SL PFL at stage 1162 and send one or more measurement report messages 1164 based on the selected SL PFL. In the measurement phase 1138, the LMF 120 may activate the Uu PFL selected at stage 1156 and the SL PFL selected at stage 1162. The positioning session continues at stage 1132 based on the selected PFL(s).

While the signal flows 1100, 1150 in FIGS. 11A and 11B utilize the UE 105 to select the preferred Uu PFL and SL PFL, the disclosure is not so limited. For example, the LMF 120, or another network entity, may be configured to select the Uu PFL and/or the SL PFL based on measurement reports provided by the UE 105, such as described in FIGS. 9B and 10B. Further, the number of Uu and SL PFLs a UE is capable of measuring in the discovery and/or measurement phases may vary. For example, a UE may be configured to measure X1 number of Uu PFLs in a discovery phase, X2 number of Uu PFLs in the measurement phase, Y1 number of SL PFLs in the discovery phase, and Y2 number SL PFLs in the measurement phase, where X1 does not equal X2, which does not equal Y1, which does not equal Y2. In other examples X1 may equal Y1, and X2 may equal Y2.

In an embodiment, the preferred Uu PFL and the preferred SL PFL may be selected based on legacy priority values assigned to the PRS resources and/or the PFLs.

Figure 12A:
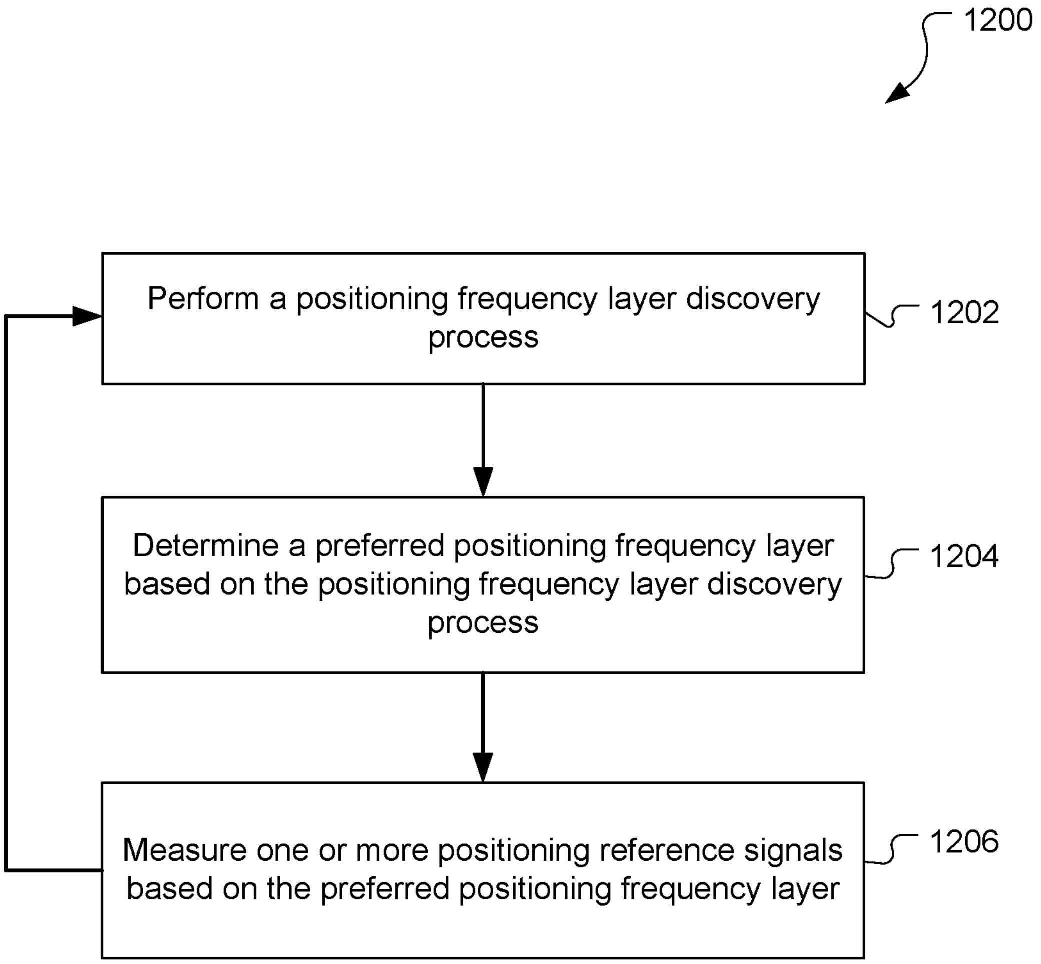
FIG. 12A is a process flow for an example method for performing a positioning frequency layer discovery process.

Referring to FIG. 12A, with further reference to FIGS. 1-11B, a method 1200 for performing a positioning frequency layer discovery process includes the stages shown. The method 1200 is, however, an example and not limiting. The method 1200 may be altered, e.g., by having stages added, removed, rearranged, combined, performed concurrently, and/or having single stages split into multiple stages. The UE 105 and/or the LMF 120 are means for performing the method 1200.

At stage 1202, the method includes performing a positioning frequency layer discovery process. In an example, referring to FIGS. 9A and 9B, the LMF 120 may be configured to initiate different PFLs sequentially and the UE 105 may be configured to perform the PRS measurements and report back. In an example, referring to FIGS. 10A, 10B, 11A and 11B, the UE 105 may be configured to report discovery and measurement phase capabilities such as a maximum number of PFLs for a discovery phase and a maximum number of PFLs for a measurement phase. The LMF 120 may provide assistance data based on the capabilities of the UE 105. In an example, the assistance data may be based on different wireless protocols and/or interfaces. The UE 105 may be configured to obtain PRS measurement in multiple PFLs based at least in part on the assistance data.

At stage 1204, the method includes determining a preferred positioning frequency layer based on the positioning frequency layer discovery process. In an example, the UE 105 or the LMF 120 may be configured to determine the preferred PFLs based on one or more performance indicators associated with PRS measurements, such as the number of TRPs/PRS resources that are detected in each of the PFLS, or a quality of the measurements (e.g., RSTD, UE Rx-Tx), or indications of LOS/NLOS for the PRS, or combinations of the performance indicators. In an example, a preferred PFL may be selected for each of a plurality of different wireless protocols used for transmitting reference signals. The selected PFL may be stored for a given UE and used in subsequent positioning sessions.

At stage 1206, the method includes measuring one or more positioning reference signals based on the preferred positioning frequency layer. In an example, the LMF 120 may activate the preferred PFL and deactivate other PFLs (e.g., the PFLs that were not selected). The positioning session may continue in a measurement phase based on the preferred PFL. In an example, the preferred PFL may be valid for a period of time T1 (e.g., msecs, secs, mins, hours, days) and the LMF 120 may iterate back to stage 1202 to perform the discovery process at the expiry of the T1 time. In an example, the UE 105 may be in motion and the LMF may be configured to perform the discovery process more often. For example, the UE may be configured to perform a discovery phase and then report PRS measurements based on the preferred PFL every 2 seconds in a measurement phase, and then perform the discovery phase again after a time period (e.g., 64 seconds). Other time periods and/or conditions, such as a quality value for the PRS measurements may be used to trigger the discovery process.

Figure 12B:
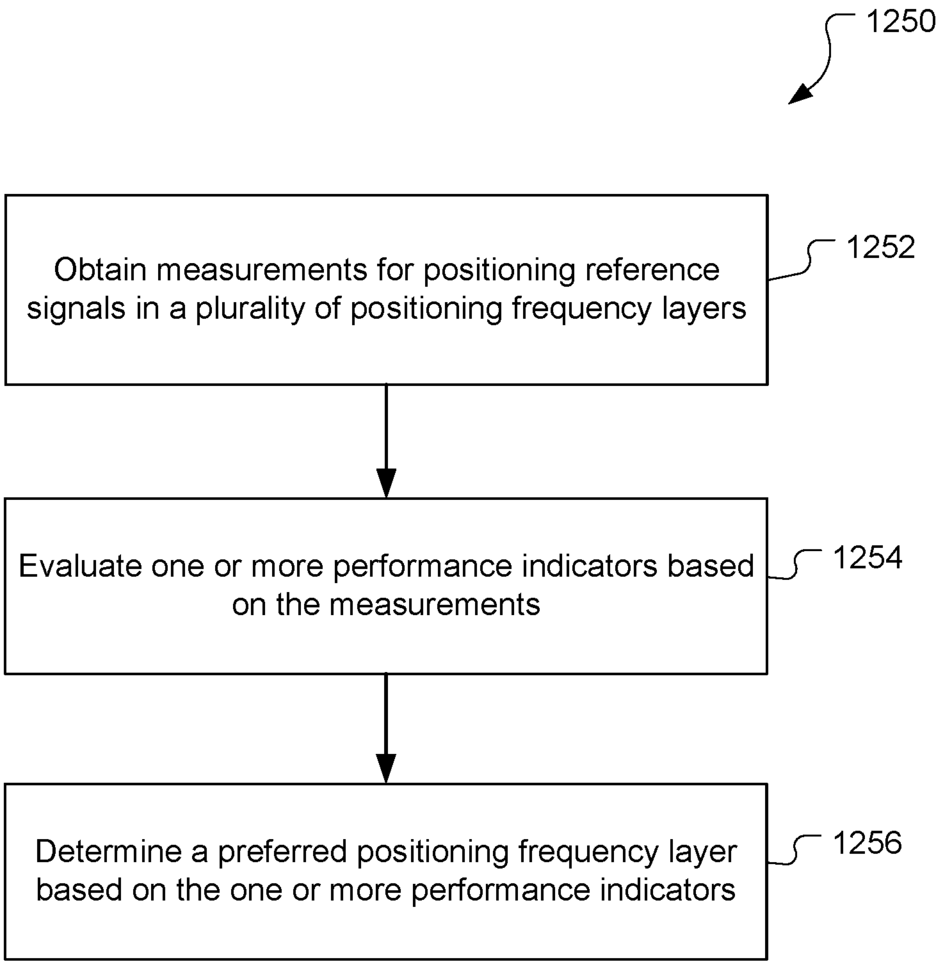
FIG. 12B is a process flow of an example method for determining a preferred positioning frequency layer.

Referring to FIG. 12B, with further reference to FIGS. 1-11B, a method 1250 for determining a preferred positioning frequency layer includes the stages shown. The method 1250 is, however, an example and not limiting. The method 1250 may be altered, e.g., by having stages added, removed, rearranged, combined, performed concurrently, and/or having single stages split into multiple stages. In an example, the method 1250 may be performed during a PFL discovery phase to select a PFL to use in a subsequent PFL measurement phase.

At stage 1252, the method includes obtaining measurements for positioning reference signals in a plurality of positioning frequency layers. A UE 200, including the transceiver 215 and the general-purpose processor 230, is a means for obtaining measurements. The UE 200 may receive assistance data from a network entity, such as the LMF 120, associated with the plurality of PFLs. In an example, the assistance data may be obtained via RRC signaling or via other broadcast signals. Referring to FIGS. 8A and 8B, neighboring wireless nodes such as base stations (e.g., gNBs, RSUs) and other user equipment may be configured to transmit PRS. The PRS may be based on different bands and may experience different path losses, or other factors which may differentiate the quality of the resulting measurements. The measurements may include RSRP, RSRQ, RTT, Rx-Tx, ToF, SNR, LOS/NLOS (peak timing), and other reference signal measurements as known in the art.

At stage 1254, the method includes evaluating one or more performance indicators based on the measurements. The UE 200, including the transceiver 215 and the general-purpose processor 230, is a means for evaluating the one or more performance indicators. The UE 200 may be configured to evaluate the measurements locally, and/or to provide the measurements to a network resource (e.g., the LMF 120) for evaluation. For example, the UE 200 may provide one or more measurement reporting messages to the LMF 120 via LPP signaling. In an example, the evaluation may include assigning a timing quality value (e.g., between 0-51) based on measurements. The evaluation may include comparing the number of TRPs/PRS resources measured in each PFL. The evaluation may include determining the PFLs with the most LOS PRS. Other signal characteristics obtained in a PFL may be compared to the respective characteristics obtained in the other PFLs to determine the relative performance of the PFLs.

At stage 1256, the method includes determining a preferred positioning frequency layer based on the one or more performance indicators. The UE 200, including the transceiver 215 and the general-purpose processor 230, is a means for determining the preferred PFL. In an example, the preferred PFL may be based on the one or more performance indicators associated with the measurements obtained at stage 1254. For example, a preferred PFL may be based on the number of TRPs/PRS resources that are detected in a PFL, or a quality of the measurements (e.g., RSTD, UE Rx-Tx), or indications of LOS for the PRS, or combinations of these and other performance indicators. In an embodiment, the UE 200 may determine the preferred PFL and provide an indication of the preferred PFL to a network entity (e.g., the LMF 120). The LMF 120 may be configured to receive PRS measurements from the UE 200 and determine the preferred PFL based on the measurements.

Figure 13:
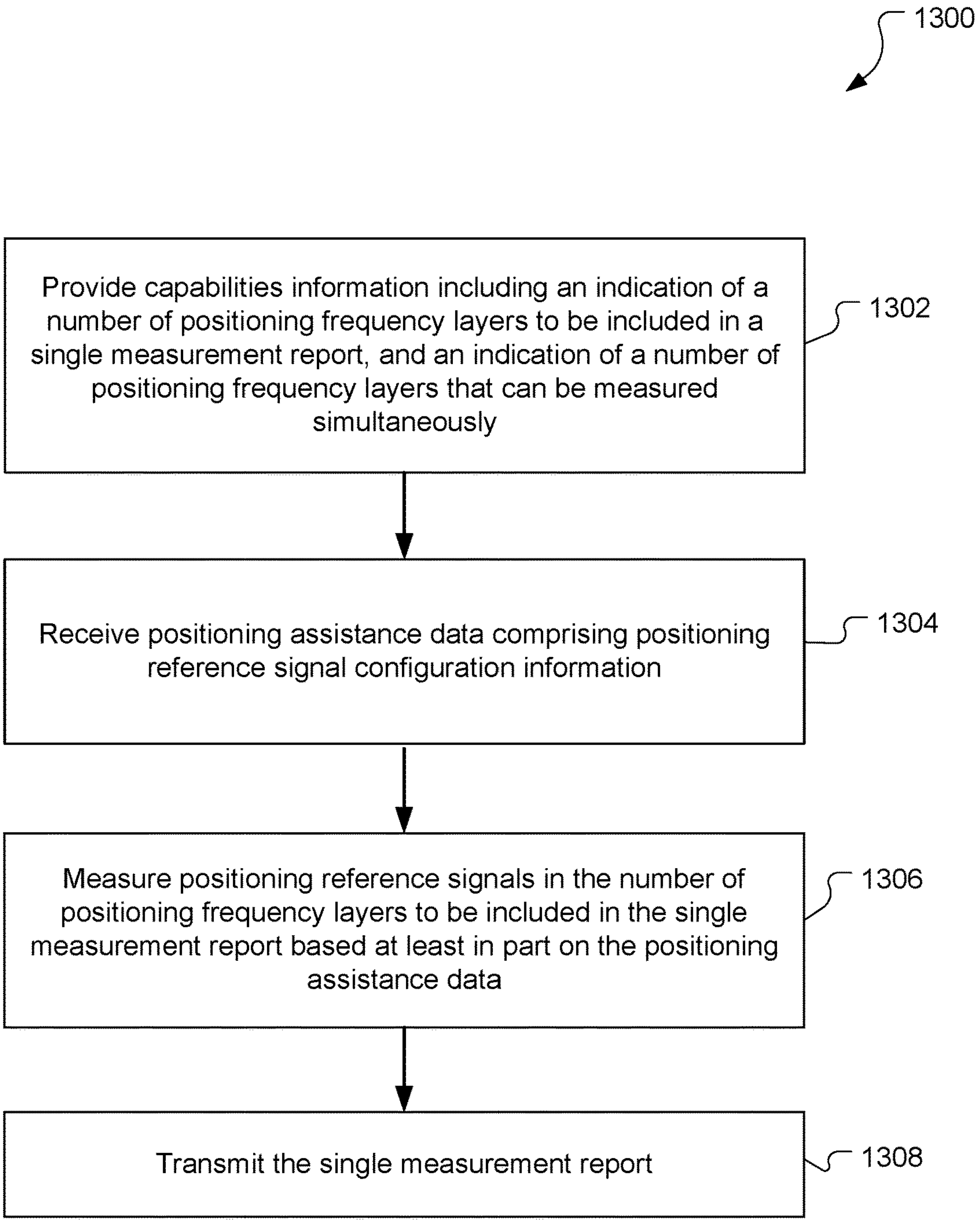
FIG. 13 is a process flow of an example method for reporting positioning reference signal measurement values.

Referring to FIG. 13, with further reference to FIGS. 1-12B, a method 1300 for reporting positioning reference signal measurement values includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes providing capabilities information including an indication of a number of positioning frequency layers to be included in a single measurement report, and an indication of a number of positioning frequency layers that can be measured simultaneously. A UE 200, including a general-purpose processor 230 and a transceiver 215, is a means for providing the capabilities information. In an example, a wireless node such as the UE 200 and may be configured to transmit one or more provide capabilities messages via NAS/LPP messaging, or other signaling techniques such as RRC, to a network entity. For example, during a PFL discovery phase (e.g., the discovery phases 926, 1026, 1136), a wireless node and a network entity may exchange capability messages to report the capabilities of the wireless node. The indication of the number of PFLs to be included in the single measurement report may be the maximum number of PFLs in the UE 200 can measure in the discovery phase (i.e., the Max PFL discovery phase parameter). The indication of the number of PFLs to be included in the single measurement report may also convey the total number of frequency layers the UE 200 can measure, or the total number of frequency layers the UE 200 can receive in assistance data. The indication of the number PFLs that can be measured simultaneously is the number of PFLs the UE 200 can support in the measurement phase (i.e., the Max PFL measurement phase parameter). Different wireless nodes may have different hardware and software capabilities. For example, different wireless nodes may be configured to operate in different frequency bands, and/or may be capable of processing larger bandwidths. Other configuration aspects of a wireless node and/or a network may determine how many PFLs a wireless node may support. In an example, a wireless node may have the ability to measure PRS in multiple PFLs during a discovery phase, and then have the ability to measure PRS in a single PFL in a measurement phase. Other combinations are also possible based on the capabilities of the wireless node. For example, referring to FIGS. 11A and 11B, the wireless node may be configured to measure PRS in multiple PFLs based on different wireless interfaces. The capabilities information may include an indication of at least one wireless interface, such as a Uu interface and a sidelink interface. Other interfaces and protocols may also be used.

At stage 1304, the method includes receiving positioning assistance data comprising positioning reference signal configuration information. The UE 200, including the general-purpose processor 230 and the transceiver 215, is a means for receiving the positioning assistance data. The positioning assistance data may be received from a network station such as a TRP 300 (e.g., LPP, RRC, etc.), or other wireless nodes such as a RSU or UE (e.g., via a D2D sidelink). The assistance data may include PRS information such as PRS resource parameters, and/or PRS identification information, associated with one or more PFLs. In an example, a network entity (e.g., LMF 120) may provide one or more assistance data messages based on the capabilities of the wireless node. In an example, referring to FIGS. 9A and 9B, the assistance data may be provided serially with multiple messages (e.g., the first, second, and third assistance data messages 908, 912, 916) when the wireless node is capable of measuring one positioning frequency layer to be included in a single measurement report. In an example, referring to FIGS. 10A and 10B, the positioning assistance data may include PRS resource parameters, and/or PRS identification information, associated with a plurality of PFLs (e.g., the assistance data messages 1008) when the wireless node is capable of using multiple PFLs in a discovery or measurement phase. In an example, referring to FIG. 11A, the positioning assistance data may also include PRS information for different wireless interfaces when the wireless node is capable of measuring PRS associated with the different wireless interfaces. Other variations of assistance data may be used to enable the wireless node to measure PRS which are within the range of the wireless node's capabilities.

At stage 1306, the method includes measuring positioning reference signals in the number of positioning frequency layers to be included in the single measurement report based at least in part on the assistance data. The UE 200, including the general-purpose processor 230 and the transceiver 215, is a means for measuring PRS in the number of PFL. The UE 200 may utilize the assistance data to perform PRS measurements such as RSRP, RSRQ on the PRS transmitted in one or more PFLs. In an example, the UE 200 may be configured to measure the PRS in each of the PFLs via time-division multiplexing (TDM) techniques. For example, referring to FIGS. 10A and 10B, the UE 200 may obtain the PRS measurement in PFL1, PFL2, PFL3 in a time sequence, and then a single measurement report will be sent to the LMF 120. Other PRS measurements such as RSTD, UE Rx-Tx, LOS/NLOS and ToF information may also be obtained and reported. In an example, the UE 200 may be configured to count the number of TRP/PRS resources it receives in each PFL. The measurement values may be stored in the memory 211 and utilized to determine a preferred PFL. In an example, the resulting measurement values may be provided to a network entity to determine a preferred PFL for the UE 200.

At stage 1308, the method includes transmitting the single measurement report. The UE 200, including the general-purpose processor 230 and the transceiver 215, is a means for transmitting the single measurement report. In operation, the single measurement report may comprise multiple measurement report messages. In an example, referring to FIG. 10A, the PRS single measurement report may be the measurement reporting messages 1022 including an indication of the preferred PFL determined by the UE 200 at stage 1020 to enable the LMF to activate the selected PFL in the measurement phase 1028. In an example, referring to FIG. 10B, the single measurement report may be one or more measurement report messages 1052 including the PRS measurements obtained at stage 1306 to enable the LMF 120 to select a preferred PFL at stage 1054. In an example, the single measurement report may include both PRS measurement values and an indication of a preferred PFL.

Figure 14:
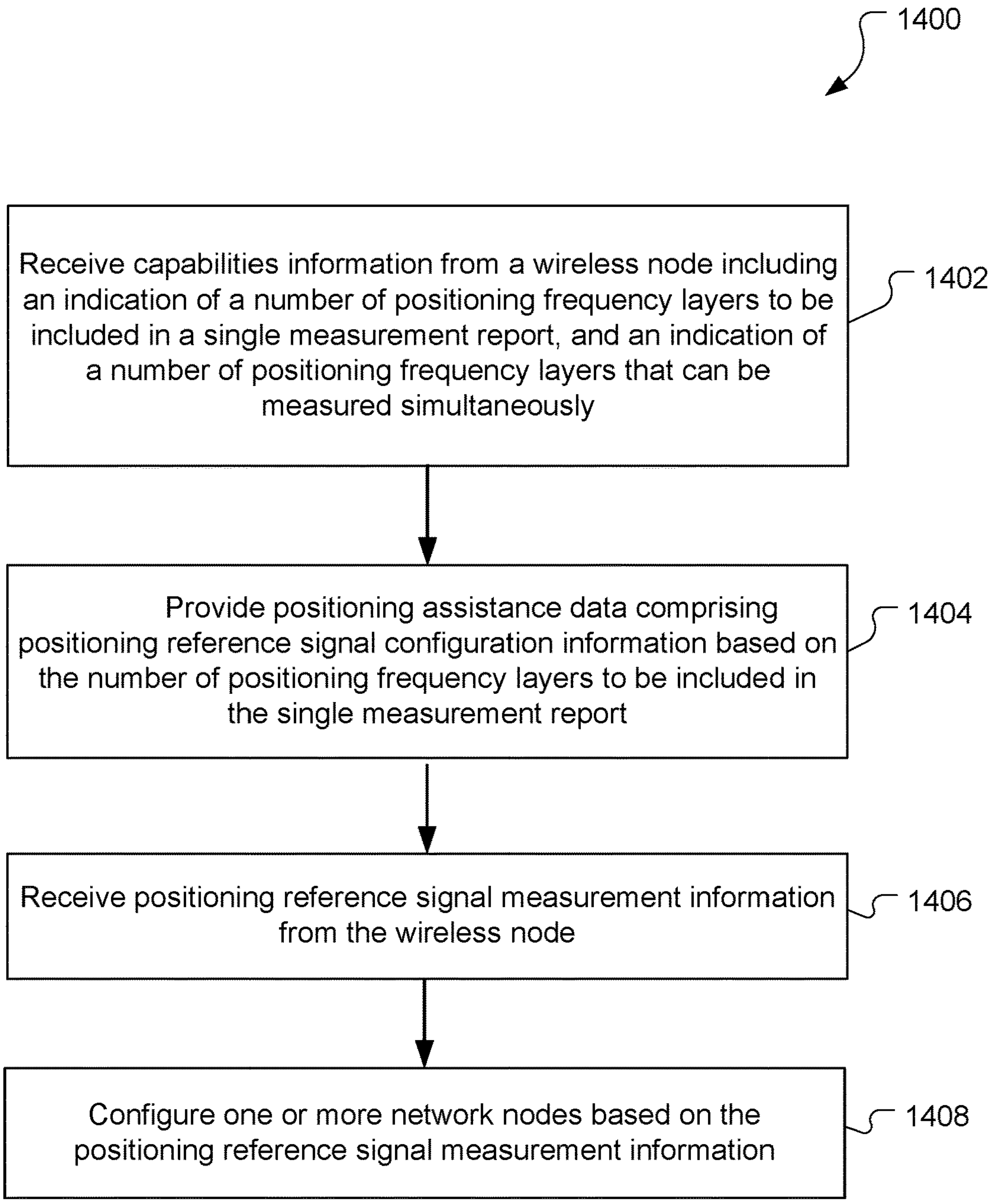
FIG. 14 is a process flow of an example method for configuring network nodes based on a preferred positioning frequency layer.

Referring to FIG. 14, with further reference to FIGS. 1-12B, a method 1400 for configuring network nodes based on a preferred positioning frequency layer includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving capabilities information from a wireless node including an indication of a number of positioning frequency layers to be included in a single measurement report, and an indication of a number of positioning frequency layers that can be measured simultaneously. A server 400, such as the LMF 120 including a processor 410 and a transceiver 415, is a means for receiving the capabilities information. In an example, the wireless node may be the UE 200 and may be configured to transmit one or more provide capabilities messages via NAS/LPP messaging, or other signaling techniques such as RRC via a serving cell, to the LMF 120. During a PFL discovery phase (e.g., the discovery phases 926, 1026, 1136), the LMF 120 and the wireless node may exchange capability messages to report the capabilities of the wireless node. In an example, referring to FIGS. 11A and 11B, the wireless node may indicate it is configured to measure PRS in multiple PFLs based on different wireless interfaces. The indication of a number of positioning frequency layers to be included in a single measurement report may include an indication of at least one wireless interface, such as a Uu interface and a sidelink interface. Other interfaces and protocols may also be used.

At stage 1404, the method includes providing positioning assistance data comprising positioning reference signal configuration information based on the number of positioning frequency layers to be included in the single measurement report. The server 400, including the processor 410 and the transceiver 415, is a means for providing assistance data. The positioning assistance data may be provided to the wireless node via one or more network nodes such as a TRP 300 (e.g., LPP, RRC, etc.), or other wireless nodes such as a RSU or other UEs (e.g., via a D2D sidelink). The assistance data may include PRS information such as PRS resource parameters, and/or PRS identification information, associated with one or more PFLs. The LMF 120 may provide one or more assistance data messages based on the capabilities of the wireless node. In an example, referring to FIGS. 9A and 9B, the assistance data may be provided serially with multiple messages (e.g., the first, second, and third assistance data messages 908, 912, 916) when the wireless node is capable of supporting a single PFL. In an example, referring to FIGS. 10A and 10B, the positioning assistance data may include PRS resource parameters, and/or PRS identification information, associated with a plurality of PFLs (e.g., the assistance data messages 1008) when the wireless node is capable of using multiple PFLs in a discovery or measurement phase. In an example, referring to FIG. 11A, the positioning assistance data may also include PRS information for different wireless interfaces when the wireless node is capable of measuring PRS associated with the different wireless interfaces. Other variations of assistance data may be used to enable the wireless node to measure PRS which are within the range of the wireless node's capabilities.

At stage 1406, the method includes receiving positioning reference signal measurement information from the wireless node. The server 400, including the processor 410 and the transceiver 415, is a means for receiving PRS measurement information. The wireless may be configured to perform PRS measurements such as RSRP, RSRQ on the PRS transmitted in one or more PFLs.

Other PRS measurements such as RSTD, UE Rx-Tx, LOS/NLOS and ToF information may also be obtained. In an example, the resulting measurement values may be received by the LMF 120 to determine a preferred PFL for the UE 200. In an example, referring to FIG. 10A, the PRS measurement information may be included in the measurement reporting messages 1022. In an example, the PRS measurement information may include an indication of the preferred PFL determined by the wireless node at stage 1020. In an example, referring to FIG. 10B, the positioning reference signal measurement information may be one or more measurement report messages 1052 including the PRS measurements obtained by the wireless node. In an example, the PRS measurement information may include both PRS measurement values and an indication of a preferred PFL.

At stage 1408, the method includes configuring one or more network nodes based on the positioning reference signal measurement information. The server 400, including the processor 410 and the transceiver 415, is a means for configuring one or more network nodes. The LMF 120 may be configured to determine a preferred PFL based on the PRS measurement information received at stage 1406. In an example, the LMF 120 may be configured to determine a preferred PFL based on PRS measurement information (e.g., based on the number of TRPs/PRS resources that are detected in a PFL), a quality of the measurements (e.g., RSTD, UE Rx-Tx), indications of LOS for the PRS, or combinations of these and other performance indicators). In an example, the wireless node may provide an indication of the preferred PFL. The LMF 120 may activate the PFL in neighboring nodes to enable the wireless node to measure DL PRS and/or SL PRS. In an example, the LMF 120 may deactivate other PFLs which the wireless node will not measure (i.e., the non-preferred PFLs). The wireless node may continue to obtain PRS measurements based on the preferred PLF through the measurement phase as previously described.

Figure 15:
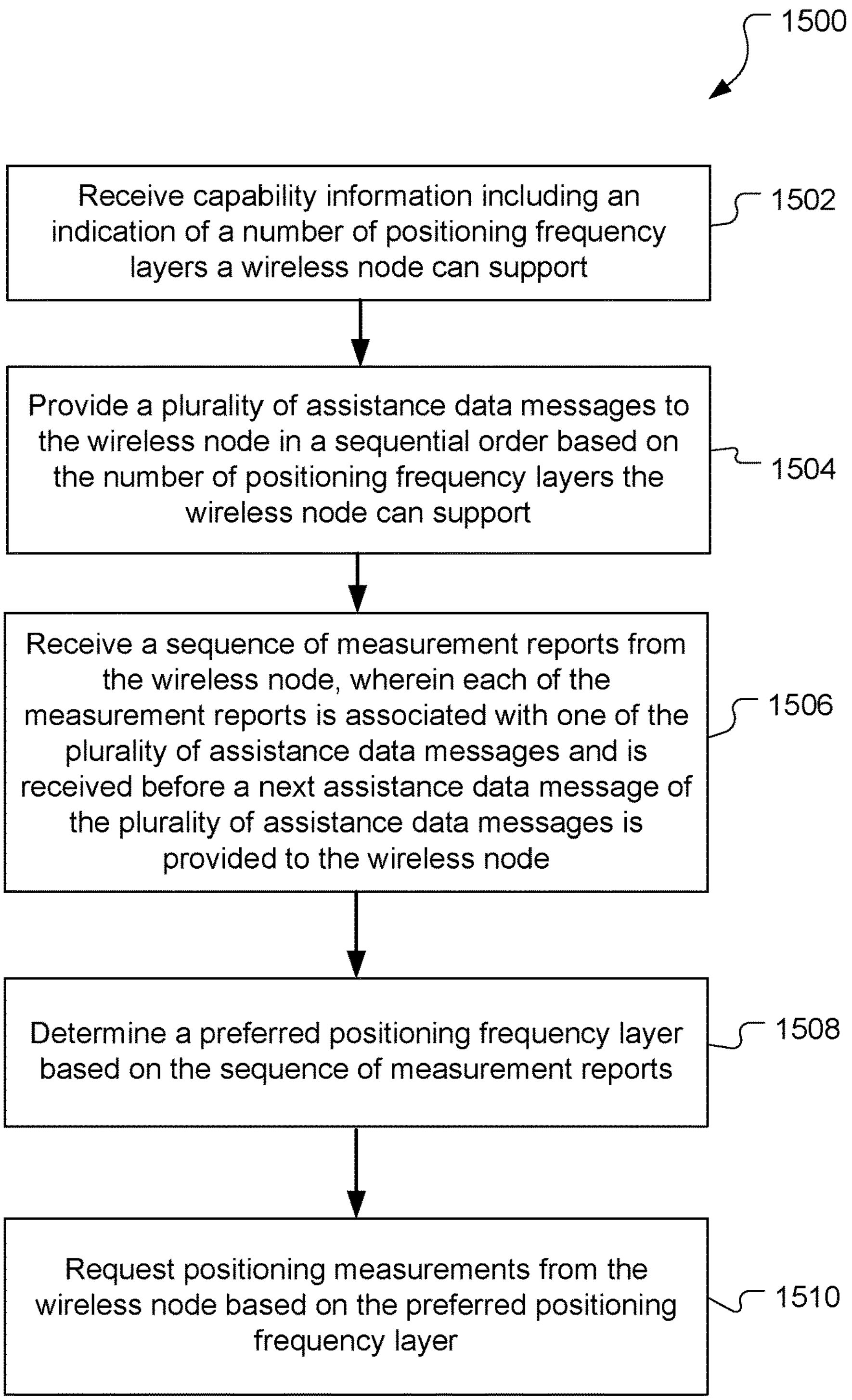
FIG. 15 is a process flow of an example method for selecting a positioning frequency layer for a positioning session.

Referring to FIG. 15, with further reference to FIGS. 1-12B, a method 1500 of selecting a positioning frequency layer for a positioning session includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes receiving capability information including an indication of a number of positioning frequency layers a wireless node can support. A server 400, such as the LMF 120 including a processor 410 and a transceiver 415, is a means for receiving the capabilities information. In an example, the wireless node may be the UE 200 and may be configured to transmit one or more provide capabilities messages via NAS/LPP messaging, or other signaling techniques such as RRC via a serving cell, to the LMF 120. During a PFL discovery phase (e.g., the discovery phase 926), the LMF 120 and the wireless node may exchange capability messages to report the capabilities of the wireless node. In an example, referring to FIGS. 9A and 9B, the wireless node may indicate it is configured to measure PRS in a single PFL (e.g., max PFL supported=1). Other UEs may be configured to support additional PFLs (e.g., 2, 3, 4, etc.).

At stage 1504, the method includes providing a plurality of assistance data messages to the wireless node in a sequential order based on the number of positioning frequency layers the wireless node can support. The server 400, including the processor 410 and the transceiver 415, is a means for providing a plurality of assistance data messages in the sequential order. The positioning assistance data may be provided to the wireless node via one or more network nodes such as a TRP 300 (e.g., LPP, RRC, etc.), or other wireless nodes such as a RSU or other UEs (e.g., via a D2D sidelink). The assistance data may include PRS information such as PRS resource parameters, and/or PRS identification information, associated with one or more PFLs. The LMF 120 may provide one or more assistance data messages based on the capabilities of the wireless node. In an example, referring to FIGS. 9A and 9B, the assistance data may be provided serially with multiple messages (e.g., the first, second, and third assistance data messages 908, 912, 916) when the wireless node is capable of supporting a single PFL. If the wireless node is capable of supporting multiple PFLs (e.g., 'X' number of PFLS), the assistance data may include the PRS resources for the first 'X' PFLs in a first assistance data message, and then PRS resources for a next 'X' PFLs in a second assistance data messages, and may continue in to send such sequences for each configured PFL the wireless node is to measure.

At stage 1506, the method includes receiving a sequence of measurement reports from the wireless node, wherein each of the measurement reports is associated with one of the plurality of assistance data messages and is received before a next assistance data message of the plurality of assistance data messages is provided to the wireless node. The server 400, including the processor 410 and the transceiver 415, is a means for receiving the sequence of measurement reports. The wireless may be configured to perform PRS measurements such as RSRP, RSRQ on the PRS transmitted in one or more PFLs. Other PRS measurements such as RSTD, UE Rx-Tx, LOS/NLOS and ToF information may also be obtained. For example, referring to FIG. 9B, the sequence of measurement reports may include the first measurement report 910*a*, the second measurement report 914*a*, and the third measurement report 918*a*. The wireless node may receive the a first assistance data message in the sequence (e.g., the first assistance data message 908, obtain PRS measurements for the first PFL at stage 910, and then send the associated first measurement report message 910*a* based on the first PFL measurements. The wireless node may receive the second assistance data message in the sequence (e.g., the second assistance data message 914), and then send the associated second measurement report message 914*a* based on the PRS measurement values associated with PFL2 obtained at stage 914. The wireless node may then receive a third assistance data message in the sequence (e.g., the third assistance data message 916), and then send the associated third measurement report message 918*a* based on the PRS measurement values associated with PFL3 obtained at stage 918. The number of assistance data messages and associated measurement reports are examples as additional or fewer PFLs may be used.

At stage 1508, the method includes determining a preferred positioning frequency layer based on the sequence of measurement reports. The server 400, including the processor 410 and the transceiver 415, is a means for determining the preferred PFL. The server 400 may be configured to determine a preferred PFL based on the sequence measurement reports received at stage 1506. In an example, referring to FIG. 12B, the server 400 may be configured to determine a preferred PFL based on PRS measurement information (e.g., based on the number of TRPs/PRS resources that are detected in a PFL), a quality of the measurements (e.g., RSTD, UE Rx-Tx), indications of LOS for the PRS, or combinations of these and other performance indicators). In an example, the wireless node may provide an indication of the preferred PFL.

At stage 1510, the method includes requesting positioning measurements from the wireless node based on the preferred positioning frequency layer. The server 400, including the processor 410 and the transceiver 415, is a means for requesting positioning measurements. In an example, the server 400 may send a LPP request location information message to the wireless node indicating the preferred PFL, and activate the PFL in neighboring nodes to enable the wireless node to measure DL PRS and/or SL PRS. In an example, the server 400 may deactivate other PFLs on neighboring base stations which the wireless node will not measure (i.e., the non-preferred PFLs). The wireless node may continue to obtain PRS measurements based on the preferred PLF through the measurement phase.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for reporting positioning reference signals measurement values with a wireless node, comprising: providing capabilities information including an indication of a number of positioning frequency layers to be included in a single measurement report, and an indication of a number of positioning frequency layers that can be measured simultaneously; receiving positioning assistance data comprising positioning reference signal configuration information; measuring positioning reference signals in the number of positioning frequency layers to be included in the single measurement report based at least in part on the positioning assistance data; and transmitting the single measurement report.

Clause 2. The method of clause 1 further comprising receiving a request from a location server to measure positioning reference signals in a single positioning frequency layer based on the single measurement report.

Clause 3. The method of clause 1 wherein the indication of the number of positioning frequency layers to be included in the single measurement report further comprises an indication of at least one wireless interface.

Clause 4. The method of clause 3 wherein the indication of the at least one wireless interface includes an indication associated with a Uu interface or an indication associated with a sidelink interface.

Clause 5. The method of clause 1 wherein the single measurement report includes an indication of a number of positioning reference signals received in a positioning frequency layer.

Clause 6. The method of clause 1 wherein the single measurement report includes one or more positioning reference signal measurement values associated with a plurality of positioning frequency layers, and the method further comprises: receiving an indication of a preferred positioning frequency layer; and measuring a plurality of positioning reference signals associate with the preferred positioning frequency layer.

Clause 7. The method of clause 1 further comprising determining a preferred positioning frequency layer based at least in part on measurement values associated with the positioning reference signals, wherein the single measurement report includes an indication of the preferred positioning frequency layer.

Clause 8. The method of clause 1 wherein a positioning frequency layer in the number of positioning frequency layers includes positioning reference signal resources associated with a plurality of network nodes.

Clause 9. The method of clause 8 wherein the plurality of network nodes includes base stations configured to transmit positioning reference signals.

Clause 10. The method of clause 8 wherein the plurality of network nodes includes user equipment configured to transmit positioning reference signals.

Clause 11. A method of selecting a positioning frequency layer for a positioning session, comprising: receiving capability information including an indication of a number of positioning frequency layers a wireless node can support; providing a plurality of assistance data messages to the wireless node in a sequential order based on the number of positioning frequency layers the wireless node can support; receiving a sequence of measurement reports from the wireless node, wherein each of the measurement reports is associated with one of the plurality of assistance data messages and is received before a next assistance data message of the plurality of assistance data messages is provided to the wireless node; determining a preferred positioning frequency layer based on the sequence of measurement reports; and requesting positioning measurements from the wireless node based on the preferred positioning frequency layer.

Clause 12. The method of clause 11 wherein the indication of the number of positioning frequency layers the wireless node can support further comprises an indication of at least one wireless protocol.

Clause 13. The method of clause 12 wherein the indication of the at least one wireless interface includes an indication associated with a Uu protocol or an indication associated with a sidelink protocol.

Clause 14. The method of clause 11 wherein determining the preferred positioning frequency layer is based at least in part on a number of positioning reference signals measured in the preferred positioning frequency layer.

Clause 15. The method of clause 11 wherein determining the preferred positioning frequency layer is based at least in part on a number of line of sight measurements obtained in the preferred positioning frequency layer.

Clause 16. The method of clause 11 further comprising deactivating one or more non-preferred positioning frequency layers on one or more neighboring base stations.

Clause 17. An apparatus, comprising: a memory; at least one transceiver;

at least one processor communicatively coupled to the memory and the at least one transceiver, and configured to: provide capabilities information including an indication of a number of positioning frequency layers to be included in a single measurement report, and an indication of a number of positioning frequency layers that can be measured simultaneously; receive positioning assistance data comprising positioning reference signal configuration information; measure positioning reference signals in the number of positioning frequency layers to be included in the single measurement report based at least in part on the positioning assistance data; and transmit the single measurement report.

Clause 18. The apparatus of clause 17 wherein the at least one processor is further configured to receive a request from a location server to measure positioning reference signals in a single positioning frequency layer based on the single measurement report.

Clause 19. The apparatus of clause 17 wherein the indication of the number of positioning frequency layers to be included in the single measurement report further comprises an indication of at least one wireless interface.

Clause 20. The apparatus of clause 19 wherein the indication of the at least one wireless interface includes an indication associated with a Uu interface or an indication associated with a sidelink interface.

Clause 21. The apparatus of clause 17 wherein the single measurement report includes an indication of a number of positioning reference signals received in a positioning frequency layer.

Clause 22. The apparatus of clause 17 wherein the single measurement report includes one or more positioning reference signal measurement values associated with a plurality of positioning frequency layers, and the at least one processor is further configured to: receive an indication of a preferred positioning frequency layer; and measure a plurality of positioning reference signals associate with the preferred positioning frequency layer.

Clause 23. The apparatus of clause 17 wherein the at least one processor is further configured to determine a preferred positioning frequency layer based at least in part on measurement values associated with the positioning reference signals, wherein the single measurement report includes an indication of the preferred positioning frequency layer.

Clause 24. The apparatus of clause 17 wherein a positioning frequency layer in the number of positioning frequency layers includes positioning reference signal resources associated with a plurality of network nodes.

Clause 25. The apparatus of clause 24 wherein the plurality of network nodes includes base stations configured to transmit positioning reference signals.

Clause 26. The apparatus of clause 24 wherein the plurality of network nodes includes user equipment configured to transmit positioning reference signals.

27. An apparatus, comprising: a memory; at least one transceiver; at least one processor communicatively coupled to the memory and the at least one transceiver, and configured to: receive capability information including an indication of a number of positioning frequency layers a wireless node can support; provide a plurality of assistance data messages to the wireless node in a sequential order based on the number of positioning frequency layers the wireless node can support; receive a sequence of measurement reports from the wireless node, wherein each of the measurement reports is associated with one of the plurality of assistance data messages and is received before a next assistance data message of the plurality of assistance data messages is provided to the wireless node; determine a preferred positioning frequency layer based on the sequence of measurement reports; and request positioning measurements from the wireless node based on the preferred positioning frequency layer.

Clause 28. The apparatus of clause 27 wherein the indication of the number of positioning frequency layers the wireless node can support further comprises an indication of at least one wireless protocol.

Clause 29. The apparatus of clause 27 wherein the at least one processor is further configured to determine the preferred positioning frequency layer based at least in part on a number of positioning reference signals measured in the preferred positioning frequency layer, or on a number of line of sight measurements obtained in the preferred positioning frequency layer.

Clause 30. The apparatus of clause 27 wherein the at least one processor is further configured to deactivate one or more non-preferred positioning frequency layers on one or more neighboring base stations.

Clause 31. An apparatus for reporting positioning reference signals measurement values with a wireless node, comprising: means for providing capabilities information including an indication of a number of positioning frequency layers to be included in a single measurement report, and an indication of a number of positioning frequency layers that can be measured simultaneously; means for receiving positioning assistance data comprising positioning reference signal configuration information; means for measuring positioning reference signals in the number of positioning frequency layers to be included in the single measurement report based at least in part on the positioning assistance data; and means for transmitting the single measurement report.

Clause 32. An apparatus for selecting a positioning frequency layer for a positioning session, comprising: means for receiving capability information including an indication of a number of positioning frequency layers a wireless node can support; means for providing a plurality of assistance data messages to the wireless node in a sequential order based on the number of positioning frequency layers the wireless node can support; means for receiving a sequence of measurement reports from the wireless node, wherein each of the measurement reports is associated with one of the plurality of assistance data messages and is received before a next assistance data message of the plurality of assistance data messages is provided to the wireless node; means for determining a preferred positioning frequency layer based on the sequence of measurement reports; and means for requesting positioning measurements from the wireless node based on the preferred positioning frequency layer.

Clause 33. A non-transitory processor-readable storage medium comprising processor-readable instructions configured to cause one or more processors to report positioning reference signals measurement values with a wireless node, comprising: code for providing capabilities information including an indication of a number of positioning frequency layers to be included in a single measurement report, and an indication of a number of positioning frequency layers that can be measured simultaneously; code for receiving positioning assistance data comprising positioning reference signal configuration information; code for measuring positioning reference signals in the number of positioning frequency layers to be included in the single measurement report based at least in part on the positioning assistance data; and code for transmitting the single measurement report.

Clause 34. A non-transitory processor-readable storage medium comprising processor-readable instructions configured to cause one or more processors to select a positioning frequency layer for a positioning session, comprising: code for receiving capability information including an indication of a number of positioning frequency layers a wireless node can support; code for providing a plurality of assistance data messages to the wireless node in a sequential order based on the number of positioning frequency layers the wireless node can support; code for receiving a sequence of measurement reports from the wireless node, wherein each of the measurement reports is associated with one of the plurality of assistance data messages and is received before a next assistance data message of the plurality of assistance data messages is provided to the wireless node; code for determining a preferred positioning frequency layer based on the sequence of measurement reports; and code for requesting positioning measurements from the wireless node based on the preferred positioning frequency layer.

The invention claimed is:

1. A method for reporting positioning reference signals measurement values with a wireless node, comprising:

transmitting capability information including an indication of a number of positioning frequency layers to be included in a measurement report of a set of measurement reports;

receiving a set of positioning assistance data messages comprising positioning reference signal configuration information for a plurality of positioning frequency layers based on the transmitted capability information;

measuring positioning reference signals on each positioning frequency layer of the plurality of positioning frequency layers based at least in part on the received set of positioning assistance data messages; and transmitting the set of measurement reports based on the measured positioning reference signals for each positioning frequency layer of the plurality of positioning frequency layers, wherein the set of measurement reports comprises an indication of a measurement for at least one positioning frequency layer of the plurality of positioning frequency layers.

2. The method of claim 1, wherein the set of measurement reports comprises an indication of each measurement for each positioning frequency layer of the plurality of positioning frequency layers, wherein the method further comprises:

receiving a request from a location server to measure positioning reference signals on a single positioning frequency layer of the plurality of positioning frequency layers based on the transmitted set of measurement reports.

3. The method of claim 1, wherein the capabilities information further comprises an indication of at least one wireless protocol associated with the number of positioning frequency layers to be included in the measurement report.

4. The method of claim 3, wherein the wireless protocol includes a Uu protocol or a sidelink protocol.

5. The method of claim 1, wherein the set of measurement reports includes an indication of a number of positioning reference signals received in a positioning frequency layer of the plurality of positioning frequency layers.

6. The method of claim 1, wherein the set of measurement reports includes one or more positioning reference signal measurement values associated with the plurality of positioning frequency layers, and the method further comprises:

receiving an indication of a preferred positioning frequency layer; and measuring a plurality of positioning reference signals associated with the preferred positioning frequency layer.

7. The method of claim 1, further comprising:

determining a preferred positioning frequency layer of the plurality of positioning frequency layers based at least in part on measurement values associated with the measured positioning reference signals for each positioning frequency layer of the plurality of positioning frequency layers, wherein the set of measurement reports includes an indication of the preferred positioning frequency layer.

8. The method of claim 1, wherein a positioning frequency layer of the plurality of positioning frequency layers includes positioning reference signal resources associated with a plurality of network nodes.

9. The method of claim 8, wherein the plurality of network nodes includes base stations or user equipment configured to transmit the positioning reference signals.

10. The method of claim 3, wherein the set of measurement reports comprises a first indication of at least one measurement for at least one positioning layer associated with a first wireless protocol of the at least one wireless protocol and a second indication of at least one measurement for at least one positioning layer associated with a second wireless protocol of the at least one wireless protocol, wherein the first wireless protocol is different from the second wireless protocol.

11. A method of selecting a positioning frequency layer for a positioning session, comprising:

receiving capability information including an indication of a number of positioning frequency layers a wireless node can support in a measurement report of a set of measurement reports;

transmitting a set of positioning assistance data messages to the wireless node for a plurality of positioning frequency layers based on the received capability information;

receiving the set of measurement reports from the wireless node based on the transmitted set of positioning assistance data messages and a set of measured positioning reference signals for each positioning frequency layer of the plurality of positioning frequency layers;

determining a preferred positioning frequency layer from the plurality of positioning frequency layers based on the received set of measurement reports; and requesting positioning measurements from the wireless node based on the determined preferred positioning frequency layer.

12. The method of claim 11, wherein the indication of the number of positioning frequency layers the wireless node can support further comprises an indication of at least one wireless protocol.

13. The method of claim 12, wherein the at least one wireless protocol includes a Uu protocol or with a sidelink protocol.

14. The method of claim 11, wherein the set of measurement reports comprises an indication of each measurement for each positioning frequency layer of the plurality of positioning frequency layers, wherein determining the preferred positioning frequency layer from the plurality of positioning frequency layers based on the received set of measurement reports comprises:

determining the preferred positioning frequency layer based at least in part on a number of positioning refence signals measured in the preferred positioning frequency layer.

15. The method of claim 11, wherein the set of measurement reports comprises an indication of each measurement for each positioning frequency layer of the plurality of positioning frequency layers, wherein determining the preferred positioning frequency layer from the plurality of positioning frequency layers based on the received set of measurement reports comprises:

determining the preferred positioning frequency layer based at least in part on a number of line of sight measurements obtained in the preferred positioning frequency layer.

16. The method of claim 11, further comprising:

deactivating one or more non-preferred positioning frequency layers on one or more neighboring base stations based on the determined preferred positioning frequency layer.

17. An apparatus, comprising:

a memory;

at least one transceiver; and at least one processor communicatively coupled to the memory and the at least one transceiver, and configured to:

transmit capabilities information including an indication of a number of positioning frequency layers to be included in a measurement report of a set of measurement reports;

receive a set of positioning assistance data messages comprising positioning reference signal configuration information for a plurality of positioning frequency layers based on the transmitted capability information;

measure positioning reference signals on each positioning frequency layer of the plurality of positioning frequency layers based at least in part on the received set of positioning assistance data messages; and transmit the set of measurement reports based on the measured positioning reference signals for each positioning frequency layer of the plurality of positioning frequency layers, wherein the set of measurement reports comprises an indication of a measurement for at least one positioning frequency layer of the plurality of positioning frequency layers.

18. The apparatus of claim 17, wherein the set of measurement reports comprises an indication of each measurement for each positioning frequency layer of the plurality of positioning frequency layers, wherein the at least one processor is further configured to:

receive a request from a location server to measure positioning reference signals on a single positioning frequency layer of the plurality of positioning frequency layers based on the transmitted set of measurement reports.

19. The apparatus of claim 17, wherein the capabilities information further comprises an indication of at least one wireless protocol associated with the number of positioning frequency layers to be included in the measurement report.

20. The apparatus of claim 19, wherein the wireless protocol includes an indication associated with a Uu interface or an indication associated with a sidelink interface.

21. The apparatus of claim 17, wherein the set of measurement reports includes a Uu protocol or a sidelink protocol.

22. The apparatus of claim 17, wherein the set of measurement reports includes one or more positioning reference signal measurement values associated with the plurality of positioning frequency layers, and the at least one processor is further configured to:

receive an indication of a preferred positioning frequency layer; and measure a plurality of positioning reference signals associated with the preferred positioning frequency layer.

23. The apparatus of claim 17, wherein the at least one processor is further configured to:

determine a preferred positioning frequency layer of the plurality of positioning frequency layers based at least in part on measurement values associated with the measured positioning reference signals, wherein the set of measurement reports includes an indication of the preferred positioning frequency layer.

24. The apparatus of claim 17, wherein a positioning frequency layer of the plurality of positioning frequency layers includes positioning reference signal resources associated with a plurality of network nodes.

25. The apparatus of claim 24, wherein the plurality of network nodes includes base stations or user equipments configured to transmit the positioning reference signals.

26. The apparatus of claim 19, wherein the set of measurement reports comprises a first indication of at least one measurement for at least one positioning layer associated with a first wireless protocol of the at least one wireless protocol and a second indication of at least one measurement for at least one positioning layer associated with a second wireless protocol of the at least one wireless protocol, wherein the first wireless protocol is different from the second wireless protocol.

27. An apparatus, comprising:

a memory;

at least one transceiver; and at least one processor communicatively coupled to the memory and the at least one transceiver, and configured to:

receive capability information including an indication of a number of positioning frequency layers a wireless node can support in a measurement report of a set of measurement reports;

transmit a set of positioning assistance data messages to the wireless node for a plurality of positioning frequency layers based on the received capability information;

receive a set of measurement reports from the wireless node based on the transmitted set of positioning assistance data messages and a set of measured positioning reference signals for each positioning frequency layer of the plurality of positioning frequency layers;

determine a preferred positioning frequency layer from the plurality of positioning frequency layers based on the received set of measurement reports; and request positioning measurements from the wireless node based on the determined preferred positioning frequency layer.

28. The apparatus of claim 27, wherein the indication of the number of positioning frequency layers the wireless node can support further comprises an indication of at least one wireless protocol.

29. The apparatus of claim 27, wherein the set of measurement reports comprises an indication of each measurement for each positioning frequency layer of the plurality of positioning frequency layers, wherein, to determine the preferred positioning frequency layer from the plurality of positioning frequency layers based on the received set of measurement reports, the at least one processor is further configured to;

determine the preferred positioning frequency layer based at least in part on a number of positioning refence signals measured in the preferred positioning frequency layer, or on a number of line of sight measurements obtained in the preferred positioning frequency layer.

30. The apparatus of claim 27, wherein the at least one processor is further configured to;

deactivate one or more non-preferred positioning frequency layers on one or more neighboring base stations based on the determined preferred positioning frequency layer.

* * * * *